United States Patent [19]
Baumeister et al.

[11] Patent Number: 4,675,755
[45] Date of Patent: Jun. 23, 1987

[54] VIDEO DISK APPARATUS PROVIDING ORGANIZED PICTURE PLAYBACK

[75] Inventors: Hans-Peter Baumeister; Roger J. Greenwald, both of Churchville; Carl N. Schauffele, Rochester, all of N.Y.

[73] Assignee: Eastman Kodak Company, Rochester, N.Y.

[21] Appl. No.: 644,096

[22] Filed: Aug. 24, 1984

[51] Int. Cl.⁴ .......................... G11B 7/00; G11B 5/00; H04N 5/781

[52] U.S. Cl. .................................. 360/35.1; 358/909; 358/102; 360/98; 360/72.2; 360/133; 369/34; 369/36; 369/178

[58] Field of Search ............... 358/335, 342, 906, 909, 358/102; 360/35.1, 69, 98, 71, 72.1, 72.2, 74.1, 74.4, 133; 369/34, 36, 37, 38, 178, 180

[56] References Cited

U.S. PATENT DOCUMENTS

| | | | |
|---|---|---|---|
| 2,853,923 | 9/1958 | Daniel . | |
| 3,724,935 | 4/1972 | Batter | 352/38 |
| 3,973,842 | 8/1976 | Woerner | 353/19 |
| 4,132,469 | 1/1979 | Harvey | 353/25 |
| 4,210,785 | 7/1980 | Huber et al. | 360/12 |
| 4,210,940 | 7/1980 | Prysby et al. | 360/33 |
| 4,224,644 | 9/1980 | Lewis | 360/72.2 |
| 4,270,150 | 5/1981 | Diermann et al. | 360/78 |
| 4,271,489 | 6/1971 | Siryj et al. | 369/38 |
| 4,527,262 | 7/1985 | Manto | 369/34 X |
| 4,539,663 | 9/1985 | Ishibashi et al. | 369/34 |
| 4,608,679 | 8/1986 | Rudy et al. | 369/36 |

OTHER PUBLICATIONS

Research Disclosure 19953 (Nov. 1980).
"Electronic Still Camera", Kihara, N. et al, Journal of Applied Photographic Engineering, vol. 9, No. 5, Oct. 1983, 159–163.
"The Electronic Still Camera A New Concept in Photography", by Kihara, N. et al, IEEE Trans. on Consumer Electronics, vol. CE-28, No. 3, Aug. 1982, 325–330.

*Primary Examiner*—Robert L. Richardson
*Attorney, Agent, or Firm*—David M. Woods

[57] ABSTRACT

A video disk player is provided for playing back a series of still pictures prerecorded on a plurality of video disks. The disks are contained in a magazine that is inserted into the player. The magazine includes an erasable, non-volatile memory for containing data related to the pictures. The player includes an editing feature for generating picture file data prescribing an organized arrangement for viewing the pictures, including data pertaining to the assignment of pictures into one or more albums, the arrangement of the viewing order, the establishment of automated viewing times, the addition of text, and the like. The picture file data is put into the non-volatile magazine memory and remains there though the magazine is removed from the player. To view an album, the magazine is inserted into the player and the magazine memory is connected into the player circuit. An album is chosen by reference to the picture file data.

18 Claims, 27 Drawing Figures

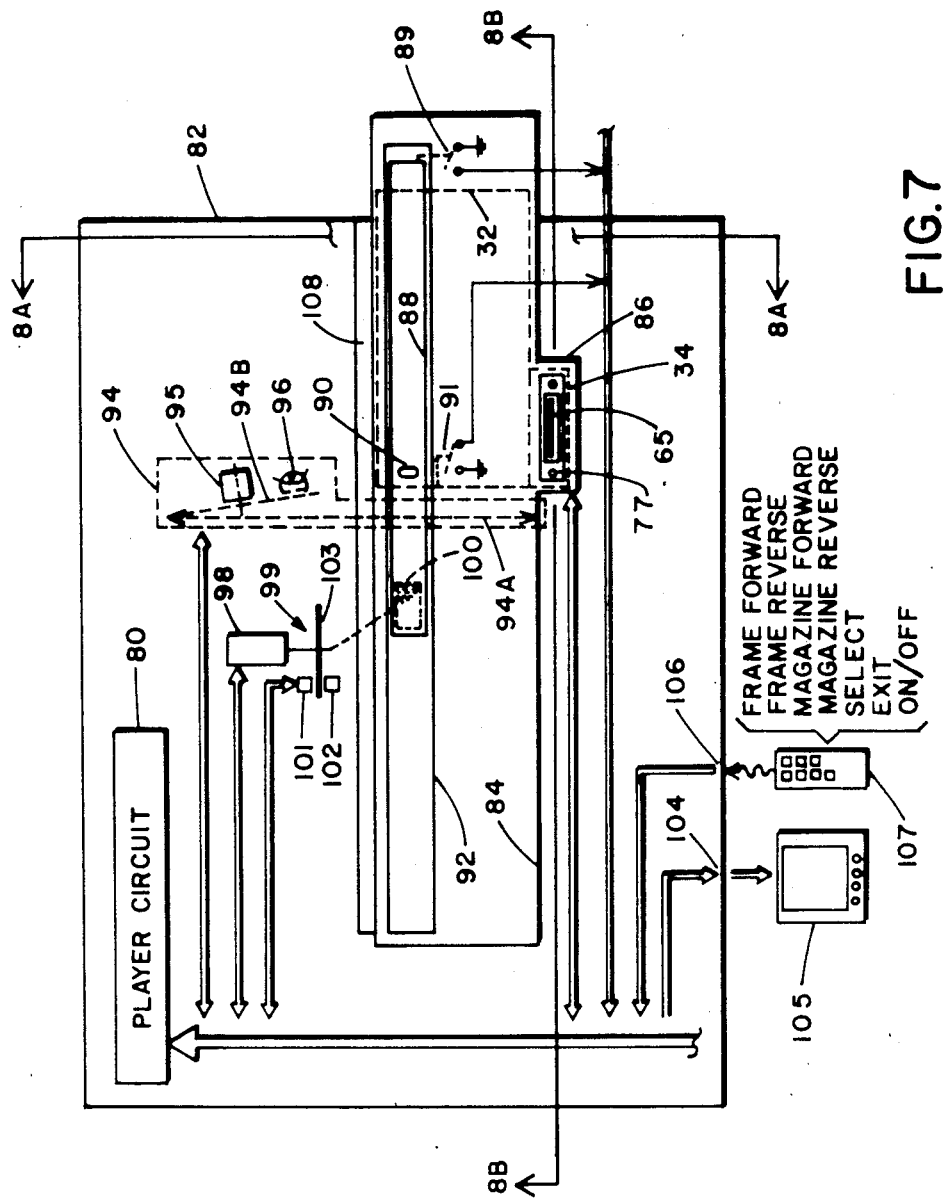

VIDEO DISK APPARATUS PROVIDING ORGANIZED PICTURE PLAYBACK

BACKGROUND OF THE INVENTION

Cross Reference to Related Applications

This patent application is related to commonly assigned, copending patent application Ser. No. 644,097, entitled "Disk Container Supporting A Detachable Memory" and Commonly assigned, copending patent application Ser. No. 644,166, entitled "Method For Editing Video Still Pictures", both filed on even date herewith.

FIELD OF THE INVENTION

The invention pertains to video apparatus for playing back a series of still pictures prerecorded on one or more video disks.

DESCRIPTION RELATIVE TO THE PRIOR ART

The organized storage of pictures often presents a difficult problem for the amateur photographer. Collections of pictures are usually stored in albums, slide trays or ordinary boxes. The organization of such collections, if it exists at all, is usually inadequate. Changing such organization as exists is usually inconvenient.

A collection of color prints is frequently stored, and viewed, in an album. The arrangement is usually chronological; each new set of prints is simply placed after the previous set. A collection of color slides is ordinarily stored in a slide tray. Organization of a slide tray requires time and patience. The color slides may be organized according to mutually exclusive categories that represent some related event or tell some common story. If the same slide must belong to different categories, duplicates must be made up. However, once the job of organizing is done, the slide show can be replayed over and over with little effort. In this connection, a combination of an ordinary tape cassette and a slide tray has been suggested to control the slide sequence, length of projection, repetition of the pictures, dissolve effects and so on (Research Disclosure Item No. 19953, Nov. 1980, p. 474-475). The necessary control signals are prerecorded on tape. Nonetheless, the task of initially organizing slides is often inconvenient. Incorporating a new set of slides into an existing organized set is also a forbidding task. Modifying the existing slide organization is equally burdensome.

Some relief from these problem is likely if the pictures are electronically-generated images, particularly if their display is controlled by modern digital processing techniques. However, amateur electronic imaging to date has been associated not with still pictures but mostly with the showing of taped motion pictures on a home television. The pictures are taken by a video camera, recorded by a tape recorder and played back by a video tape player connected to the television. It is common for a sequence of short motion picture scenes to be on one tape, some scenes related to others and some not. It has been suggested that tape players can provide selective, and automatic, picture viewing of such short scenes from prepared programs entered into the player. For example, U.S. Pat. Nos. 4,210,785 and 4,224,644 describe players where the prepared program is stored on the tape and retrieved by the player at the beginning of playback. The programmed player then provides a preselected sequence of motion picture scenes.

Video still imaging is a more recent proposal that offers the amateur photographer a display system with features analogous to a collection of prints or slides. A typical video still camera uses a small magnetic disk as its memory device (see "Electronic Still Camera" by Kihara, N. et al. *Journal of Applied Photographic Engineering,* Vol. 9, No. 5, Oct. 1983, 159-163). A companion player is envisioned which, when a recorded disk is inserted into it, converts the signals recorded on the disk into a television signal. Each disk may store not only a number of still pictures but certain picture-related data, such as the time alotted to viewing each picture, the order of viewing, titles and text. (Such picture-related data may be contained with each picture on the picture track or on one or more special tracks on the disk.) In other words, the pictures on a disk can be given a rudimentary organization. Most video disk players will have digital processing capability—usually in a microcomputer and its programs. By processing the picture-related data, the player can provide customized, and automatic, picture viewing according to some predetermined organization. Such a rudimentary organization can be successful if each disk is a self-contained collection of pictures. That is, a useful organization can be arranged if it is limited to the confines of a single disk.

This confined type of picture organization will not be useful with a multi-disk player. In such a case, for example, a magazine of 30 disks is inserted into a player adapted to cycle through the disks. Each video disk contains, for example, 25 full-frame pictures or 50 single field pictures on concentric tracks. The player then can access as many as 1500 pictures from such a magazine The capacity of such a magazine is easily equivalent to many picture albums (or slide trays), each album being devoted to images of like content, that is, to a particular event or subject. Several distinct albums are ordinarily spread across and intermixed among several disks without regard to disk boundaries.

The problem with multi-disk operation is with efficient use of such a dispersed picture collection. To use such a collection, it is first desirable to see what albums are in the collection (i.e., spread across the magazine). Besides the names of albums, it is also necessary to at least know which disks are assigned to which album. One would like to put the album names on the television, select from the television screen a particular album for viewing and then automatically provide the list of disks to the player. The problem is how to assemble this information since it is distributed across all the disks. One way is to cycle through all the disks, storing the album information (i.e., the picture-related data) as the player goes through each disk in the magazine. This process takes time--time to load each disk from the magazine to the player, time to bring each disk up to speed and position a playback head, and time to unload each disk. Especially to a viewer accustomed to the quick response of computers and video display, the sixty or more seconds delay in "getting the show started" can make the difference between acceptance and rejection of such a viewing arrangement.

SUMMARY OF THE INVENTION

The invention deals with this matter of response delay in a multi-disk system by prescribing a mode of data handling in which picture-related data is located where it is most pertinent to the rapid use of the video picture collection. Instead of having such data scattered across many disks, it is kept where it can be immediately screened for prompt viewing and decision making. With this invention, the amateur photographer can efficiently organize a large collection of video pictures spread across many disks into a video picture file that contains many picture albums. With prompt access to data pertaining to the video picture file, the amateur photographer can quickly modify the picture file to incorporate a new set of pictures or otherwise modify the existing organization.

More particularly, in a multi-disk player which accepts a magazine full of disks, a non-volatile memory accompanies the magazine in order to contain the needed picture-related data. By quickly incorporating the magazine memory into the player circuit as soon as the magazine is inserted, many of the response-related drawbacks inherent in use of a video picture file vanish.

According to the invention, video apparatus is provided for playing back pictures prerecorded on a plurality of video disks. A magazine is provided for containing the video disks. Storage means accompany the magazine for storing data related to the pictures on the disks. Means are provided for generating operating data prescribing an arrangement for viewing the pictures. The operating data is written into the storage means and used in connection with playing back the pictures to provide the prescribed viewing arrangement. The means generating the operating data includes an editing capability, which permits assignment of the pictures to one or more categories based on image content and ordering of the display of the pictures according to a particular sequence. Titles may be added to describe the categories and descriptive text may be added to describe the pictures. Means are provided to select a particular category and display the pictures within the selected category according to the prescribed sequence.

According to a preferred embodiment of the invention, the storage means comprises an erasable, non-volatile memory that is appended to the magazine. According to another embodiment of the invention, the magazine-disk-player interface is arranged such that the picture-related data is distributed according to accessibility. Data that should be immediately accessible to the player for setting up the video picture file is stored in the non-volatile magazine memory; other supplementary data, though desirable for a complete picture display, can wait until the respective pictures are accessed. Such supplementary data is stored on the video disks. Nonetheless, it is usually feasible for substantially all the picture-related data to be in the magazine memory.

BRIEF DESCRIPTION OF THE DRAWINGS

The invention will be described with reference to the figures, wherein:

FIG. 7 is a partially schematic plan view of a video disk player according to the invention;

DETAILED DESCRIPTION OF THE PREFERRED EMBODIMENT

Because the art of magnetic recording and playback is well known in general, and specifically in connection with magnetic disks, the present description will for the most part be directed to elements forming part of, or cooperating more directly with, apparatus embodying the present invention. Elements not specifically shown or described may be selected from those known in the art.

Figure 1:
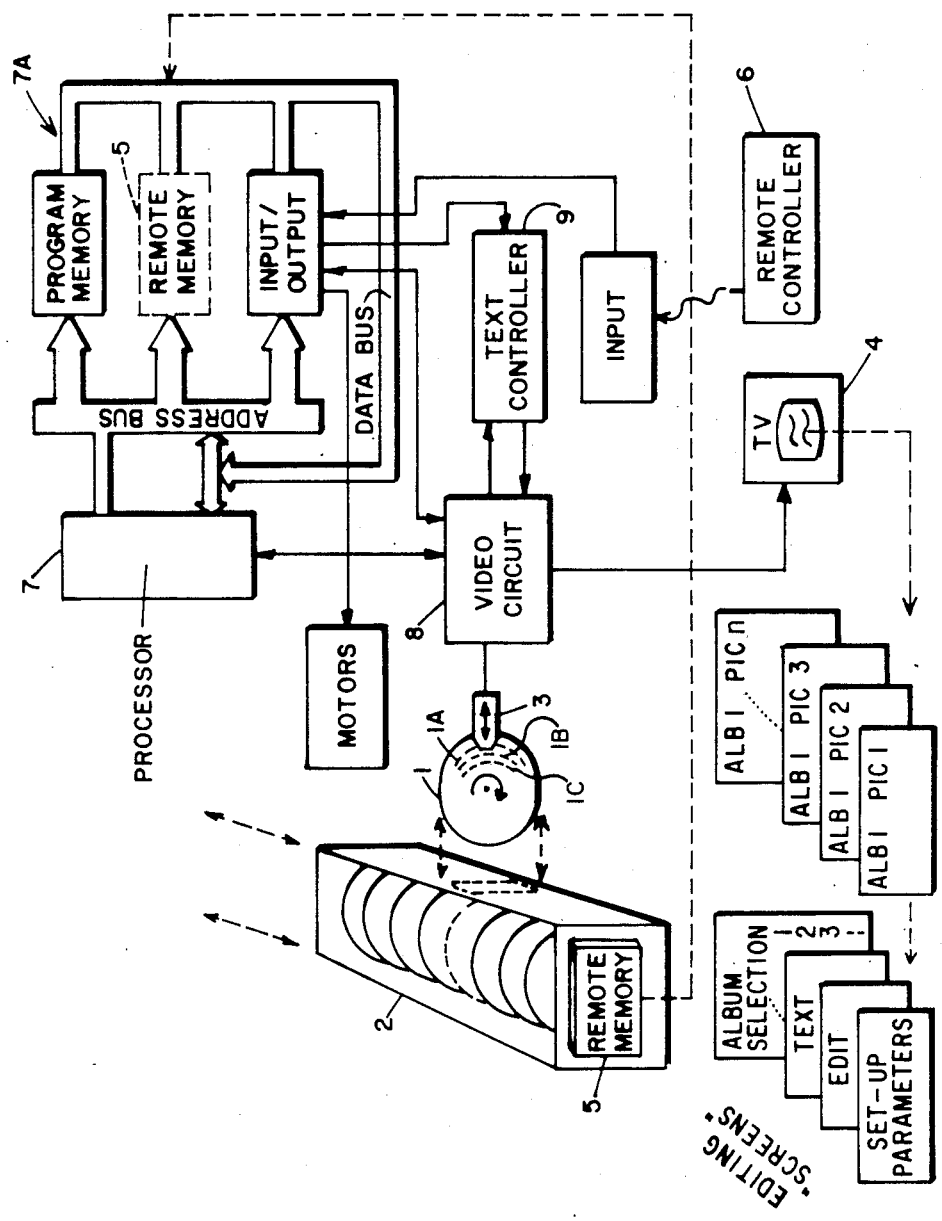
FIG. 1 is a schematic overview of video apparatus according to the invention.

It is helpful to begin by considering FIG. 1, which discloses a schematic overview of a video disk player providing organized picture playback according to the invention. The player is especially useful with a plurality of video disks organized into a video picture file. It is also helpful to state at the outset—and to recall during subsequent detailed disclosure—that the principal use of the video picture file is in organizing the display of many pictures, say 1500, prerecorded on many video disks, say 30. This objective should not be forgotten though the disclosure frequently deals with a single disk and a single picture, i.e., the particular disk removed from a stack of many disks and the picture from a particular track on the removed disk.

FIG. 1 shows a video disk 1 that has been automatically removed from a container 2. Though shown in the preferred form of an elongated tray, the container 2 may take other forms (such as a circular "carousel" tray) adapted for use according to the invention. The container 2, which is removable from the player, stores a plurality of such video disks. Each disk may be optical or magnetic, rigid or floppy. The disk 1 has many concentric video tracks 1A, 1B, 1C . . . , each storing one picture. A playback head 3 is seen adjacent one of these tracks for generating a picture signal from the disk. The player circuit, shown as a block diagram, not only reproduces each picture for display on a television 4 but also calls up the pictures—by moving one disk after another into the player—in a particular arrangement prescribed by the video picture file. The video picture file provides for several, say twenty, categories or albums of like image content. Within each category, pictures may be annotated with text, have different viewing times, and the like.

Video file operating data necessary for quickly establishing and using the video picture file is contained in a remote memory 5 accompanying the container 2. The remote memory 5 may be a solid state device attached to the container 2 as a separate element as shown by FIG. 1. It may also be a magnetic stripe formed on the container 2 or a removable element, say one of the disks, taken from the container when it is in the player. The remotely-stored data prescribes an arrangement for viewing the pictures. This data is initially generated by editing the pictures, that is, by assigning some of the pictures to one or more albums, skipping others, adding text to the assigned pictures and so on, according to the taste of the photographer.

The photographer communicates with the player circuit by observing editing "screens" that provide a guide to selections and then entering a decision via an infra-red remote controller 6. The video file operating data is stored by the player circuit in the remote memory 5 and remains there though the container 2 is removed from the player. To view an album, the container 2 is inserted into the player and the remote memory 5 is connected into the player circuit. The photographer—or any viewer—selects an album by observing album selection "screens" generated from the operating data and pressing buttons on the controller 6. The pictures are then obtained in a rearranged order according to the particular album by accessing the disks, and the picture tracks on the disks, in a rearranged sequence—that is, a sequence unlike the order of disks, and tracks on the disks, as stored in the container 2. Viewing then proceeds automatically through the album with the viewer essentially unaware of the particular disks and tracks being accessed.

The player circuit includes a digital processor 7 that operates by means of programs stored in a program memory forming part of a memory array 7A. The processor 7 operates the player by coordinating signals from a variety of input sensors, including the remote controller 6 and the head 3, with commands to a variety of output devices, including the motors that operate the magazine, remove the disk, position the head, and the like. The display signal to the television 4 is provided by a video circuit 8 that switches between a picture signal from the head 3 and a text signal from a text controller 9, which generates the aforementioned "screens".

The key to avoiding response delay and providing a viable and attractive video picture file lies in the provision of the memory 5 and its quick incorporation into the memory array 7A of the player circuit. (In the case of a remote memory that must be read, say a stripe or a dedicated disk, its data is transferred to a random-access memory in the array 7A). Having the data stored in the memory 5 avoids cycling through all the disks in the container 2 when starting up. The digital processor 7 can easily write the necessary operating data into the memory 5 and retrieve it therefrom with little delay. During playback the processor 7 addresses data in the memory 5 pertaining to the picture signal reproduced by the playback head 3. Pictures are then displayed on the television 4 according to the prescribed viewing arrangement set forth by the video file operating data in the memory 5. In general the viewing experience is akin to being guided, with commentary, through a well-organized picture album. Since the work of organizing the pictures for playback was completed during editing, all the viewer need do is sit back, relax and enjoy the show.

A video disk player providing organized picture playback according to the invention is disclosed by FIG. 1. The remaining Figures provide supporting detail relative to the disk and container (FIGS. 2-6), to mechanical aspects of the player (FIGS. 7-12), to the player circuit (FIGS. 13-15) and to aspects of the video file operating system (FIGS. 16-24).

Figure 2:
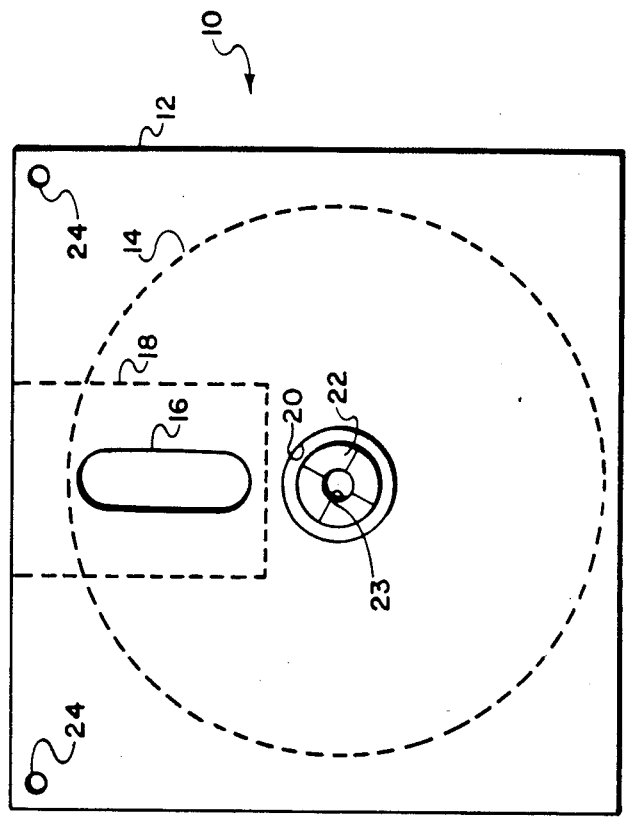
FIG. 2 is a view of a cartridge showing also an enclosed magnetic video disk.

Preferred apparatus for generating a video picture file according to the invention uses a plurality of magnetic video disks, each contained in a protective cartridge and assembled together in a container. A suitable cartridge 10 is shown by FIG. 2. The cartridge 10 includes a hard plastic shell 12 enclosing a magnetic floppy disk 14 (shown by broken line). A slot opening 16 in the shell 12 permits one or more read-write heads (which will be described later) to contact a selected section of the magnetic disk 14. The cartridge may include an automatically closed shutter 18 which is opened in order to expose the surface of the magnetic disk 14 to the read-write head . The shell 12 is also provided with a central aperture 20 that exposes an underlying hub 22 attached to the center of the magnetic disk 14. The hub has a central hole 23 for engaging a drive spindle of the player (which will be described later). It is also commonplace to have one or more alignment apertures, such as holes 24, in the shell 12.

When the cartridge is inserted into the player, alignment pins penetrate the holes 24 and the drive spindle engages the central hole 23, thereby centering the disk 14 with reference to the read-write head. For purposes of the following description, the disk 14 has sufficient capacity for a plurality of, say 50, concentric picture tracks that are exposed through the slot opening 16. Though not utilized in the preferred embodiment of the invention, an additional data track may be provided; it may be placed inboard or outboard of the picture tracks. Alternatively, or in addition, data may be placed on the picture track, for example, by modulating a buried subcarrier signal.

Figure 3:
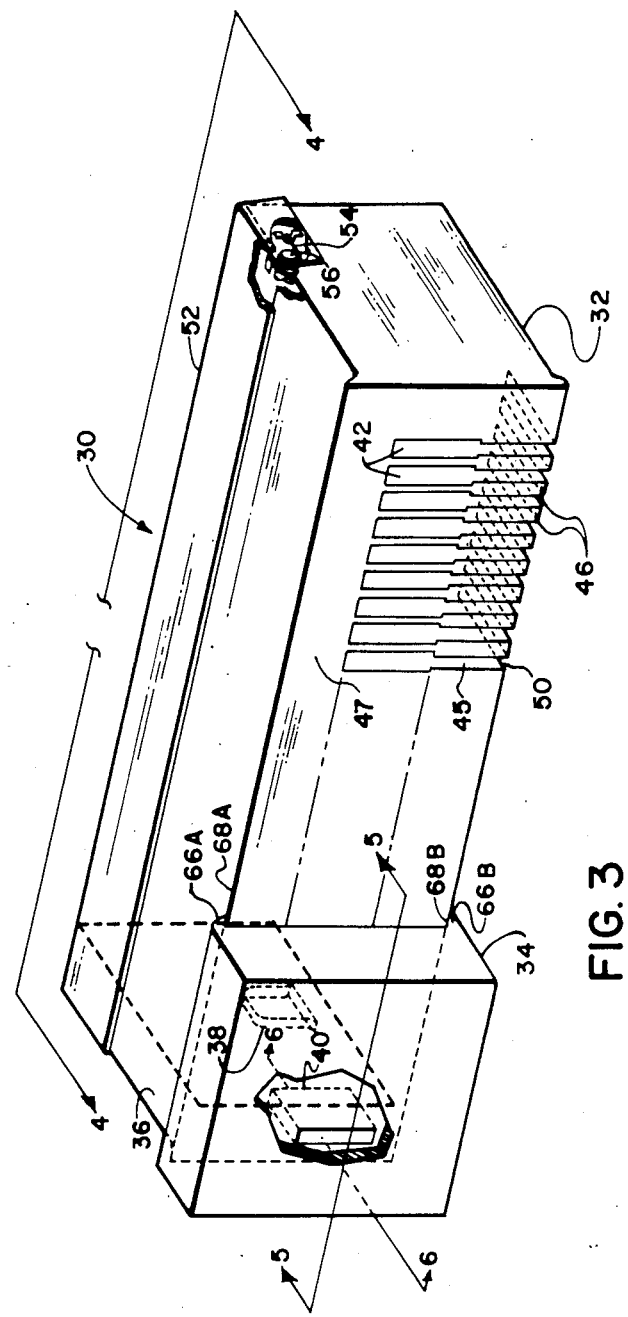
FIG. 3 is a perspective view of a magazine for a plurality of cartridges and an attached memory module according to general aspects of the invention.

FIG. 3 shows a multi-cartridge tray 30 composed of a cartridge magazine 32 and a memory module 34. The magazine 32, as disclosed in the preferred embodiment, contains 30 cartridges though magazines of other sizes, say for 10 or 20 cartridges, may also be used. The following description should be read in connection with the sectional views of FIGS. 4, 5 and 6 as well as the perspective view of FIG. 3. Both the magazine 32 and the memory module 34 are molded of rigid plastic. The magazine 32 includes a thickened end 36 having two cut-away areas, a magazine drive slot 38 and a module locking slot 40. The interior of the magazine 32 is divided into 30 cartridge storage slots 42 (FIG. 3 shows only a few of these slots) separated by rigid plastic walls 44 that afford clearance for the cartridge shuttle (described later), the device that moves the cartridges in and out of the magazine 32. The back of each slot 42 is narrowed toward the bottom by widened portions 46, leaving a narrowed slotted opening 45. The back is completely closed at the top by a plate 47 extending across the magazine 32. The magazine has a raised floor 48 to support the cartridges. Part of the raised floor 48 toward the back of the magazine is cut away forming a slot opening 50 that joins with the narrowed slot opening 45 on the back of the magazine 32. The joined slot openings 45 and 50 leave just enough space in between to permit the bottom of the shuttle to enter. The cartridges are put in the magazine 32 from the side designated in part by the line 4—4 (FIG. 3) when a cover 52 is lifted. The cover 52 is biased in a closed position by a spring 54 coiled around a pivot pin 56 of the cover 52 and anchored at opposite ends to the magazine body and the cover 52. The cartridges are prevented from falling out the back and bottom of the magazine by the plate 47 and the walls forming the narrowed slot openings 45 and 50.

Figure 5:
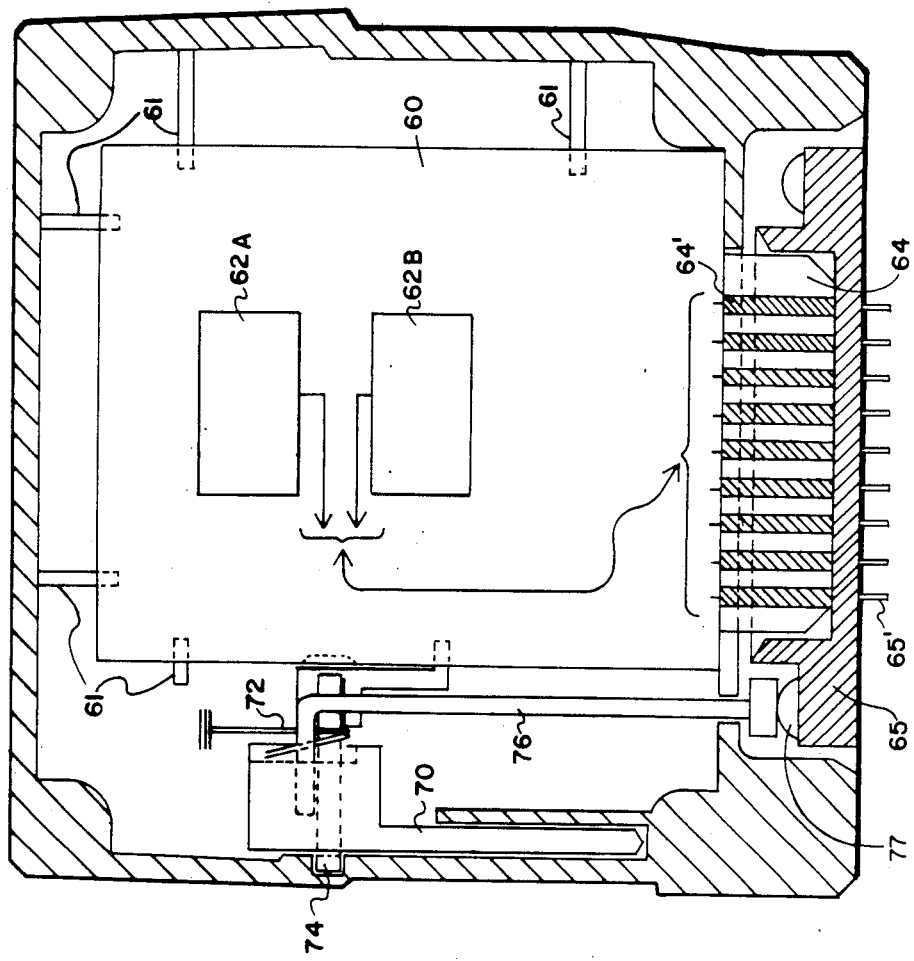
FIG. 5 is a sectional view through the memory module taken along the line 5—5 in FIG. 3.

The memory module 34 contains a circuit board 60 (best seen in FIG. 5) held in place by lugs 61 molded into the module 34. One or more solid state memory devices 62 (A, B, C . . . ) are mounted on the circuit board 60. In the preferred embodiment, two memory devices 62A and B are provided. Each memory device 62 is an electrically erasable programmable read-only memory (EEPROM). Such memory devices are well-known and can be programmed, electrically erased by the programmer, and reprogrammed. The signal and power leads from the devices 62A and B are brought out to a conventional edge connector 64, which is shown in FIG. 5 mated with a complementary socket 65 located in the player. The edge connector 64 has a series of metallic contacts 64' which meet similar contacts in the socket 65 that terminate in a series of external leads 65'. The player processing circuits connect to the leads 65'.

Figure 6B:
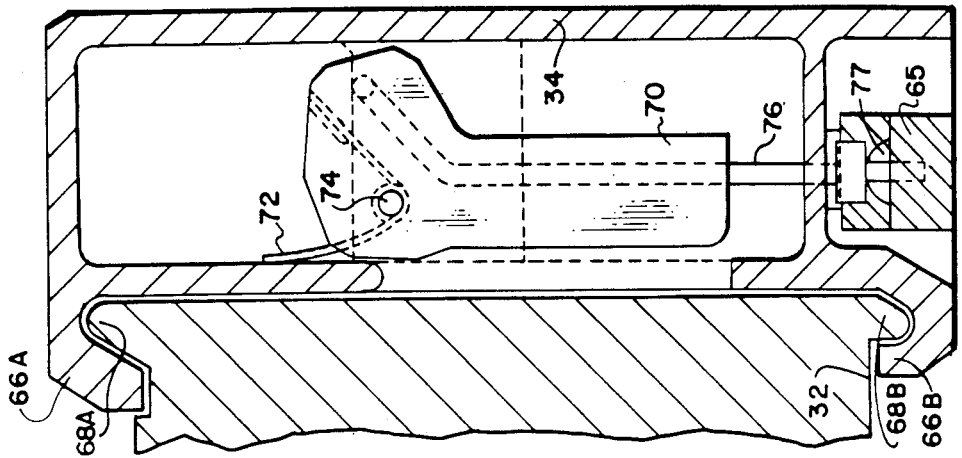
FIGS. 6A and 6B, are sectional views through the memory module and a portion of the magazine taken along line 6—6 in FIG. 3, showing both the locked condition (FIG. 6A) when the magazine and memory module are removed from the video player and the unlocked condition when they are placed in the player (FIG. 6B)
Figure 6A:
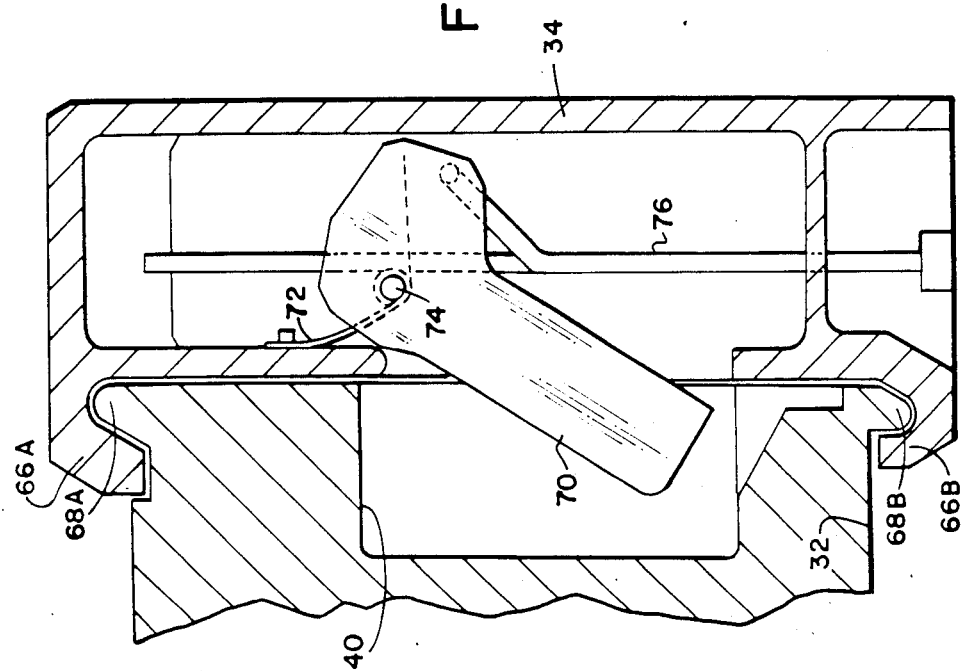

The memory module 34 is held in place on the magazine 32 by a pair of projecting flanges 66A and 66B which conform to, and overhang, a pair of complementary rails 68A and 68B formed along the back length of the magazine 32. The memory module 34 can be fastened in place to the magazine 32, in the locked position shown by FIG. 3, by a locking key 70 that is biased into the locking slot 40 by a spring 72 coiled around a pivot pin 74 and anchored at opposite ends to the module 34 and the key 70. FIG. 6A shows the key 70 in its locked position, which prevents movement of the magazine 32 with respect to the module 34. An unlocking plunger 76 hangs from one end of the key 70. FIG. 6B shows the unlocked position when the module 34 is placed into the player; then the plunger 76 is forced into the module 34 as its end encounters a mounting bolt 77 for the socket 65. In the unlocked position illustrated by FIG. 6B, the memory module 34 is detached from the magazine 32 and can be moved with respect to the magazine 32 along the rails 68A and 68B. In the preferred embodiment, the memory module 34 is detached from the magazine 32 and immobilized with respect to the player. The magazine 32 is then free to slide adjacent the module 34 and between its projecting flanges 66A and 66B (The specific cooperation of the preferred magazine and memory module is the subject of related patent application Ser. No. 644,097.)

Figure 8A:
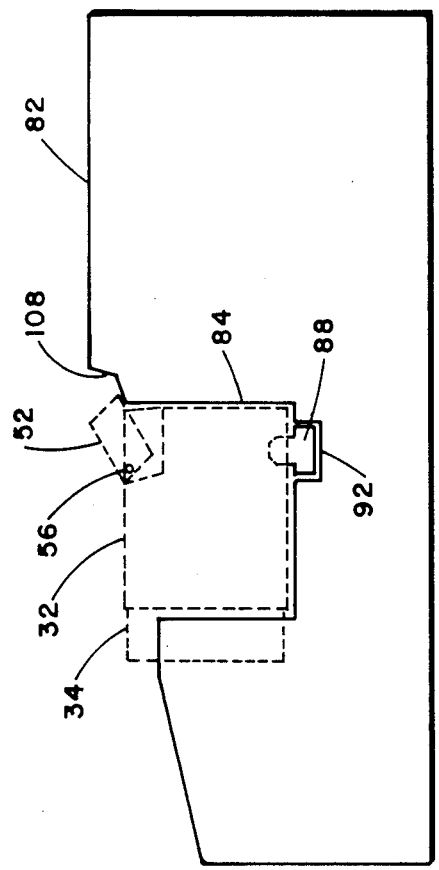
FIGS. 8A and 8B are sectional views of the video player taken along the lines 8A-8A and 8B-8B in FIG. 7.
Figure 8B:
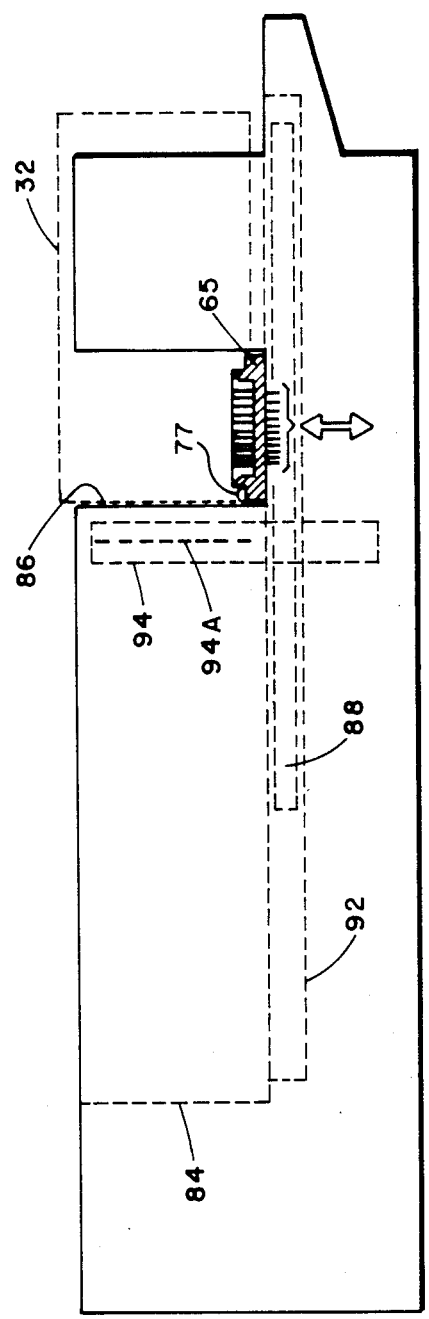

The magazine 32 and the module 34 are intended for use in the video disk player illustrated, in plan view, by FIG. 7 and, in sectional views, by FIGS. 8A and 8B. FIG. 7 is a partially schematic view in that it shows both the player circuit 80 with its input and output connections and an outline of the physical enclosure 82 of the player and certain other physical parts that cooperate with the magazine 32. Looking first within the enclosure 82, it includes a channel 84 for receiving the magazine 32, shown here by broken line. One side of the channel 84 is formed into a pocket 86 for receiving the memory module 34, also shown here by broken line. (The socket 65 and the mounting bolt 77 are shown at the base of the pocket 86.) The magazine sits atop an elongated rack 88 having a geared underside. Before loading the magazine 32 into the player, the rack 88 is repositioned until it trips a switch 89, indicating to the circuit 80 that it is in position to receive a magazine 32. In this position the magazine drive slot 38 receives a locating nub 90 on the rack 88 when the magazine 32 is placed into the channel 84. At the same time the memory module 34 slips into the pocket 86 and engages the socket 65. The mounting bolt 77 forces the plunger 76 upward, moving the key 70 out of the locking slot 40. With the magazine 32 in place, and the memory module 34 unlocked from the magazine, the rack 88 is conditioned for movement, and the magazine 32 therewith, along a track 92. A switch 91 is tripped when the rack 88 moves the magazine 32 its maximum distance into the player, indicating to the circuit 80 that the last cartridge is ready for access.

The player circuit 80 is shown connected to several parts of the video disk player. One connection is to a shuttle transport and disk drive assembly 94, which removes a cartridge 10 from the magazine 32 and moves it into the player along the path 94A. There it is pivoted (to path 94B) so that the hub 22 of the disk engages the spindle of a drive motor 95 and the slot opening 16 receives a read-write head 96. The circuit 80 also communicates control signals to and from a magazine drive motor 98 and a motion sensor 99, which detects operation of the motor 98. The drive motor 98 connects by reduction gearing to a pinion gear 100, which drives the magazine rack 88. The motion sensor 99 includes a chopper wheel 103 interposed between a photosensor 101 and a photoemitter 102. Pulse signals from the photosensor 101 correlate to movement of the rack 88 and the magazine 32 therewith. The player circuit 80 also receives magazine position signals from the switches 89 and 91. The circuit 80 further connects with the EEPROM memory devices 62A and 62B in the memory module 34 by way of the socket 65.

The remaining circuit connections are directed to input/output terminals 104 and 106. A television 105 is connected to terminal 104 for viewing pictures and data retrieved from the magnetic disk 14 and the EEPROM devices 62A and 62B. A hand controller 107 is coupled, by infra-red radiation, to the terminal 106. The following named buttons are located on the controller:
 Frame Forward
 Frame Reverse
 Magazine Forward
 Magazine Reverse
 Select
 Exit
 On/Off
Pressing one of these buttons on the hand controller 107 applies a corresponding infra-red signal to the terminal 106, which includes an infra-red sensor and decoder. From there the decoded signal is conveyed to the player circuit 80. Several buttons serve multiple functions depending on which control mode is active in the circuit 80. That is, pressing such a button means one thing in one mode and another thing in another mode. More will be said about these functions and modes when the circuit 80 is described.

The sectional view of FIG. 8A shows that the enclosure 82 has a beveled seat 108 which catches the edge of the cover 52 when the magazine 32 is placed into the channel 84. The cover 52 pivots around the pin 56, thus fully opening the cartridge storage slots 42 to the player and permitting the cartridges 10 to be pushed from the magazine 32. For this to happen the magazine 32 is advanced forward—by driving the rack 88—until the desired cartridge storage slot 42 is aligned with the shuttle path 94A. Then the cartridge is removed from the magazine 32 and moved into the video disk player adjacent the head 96 for playback.

Figure 9:
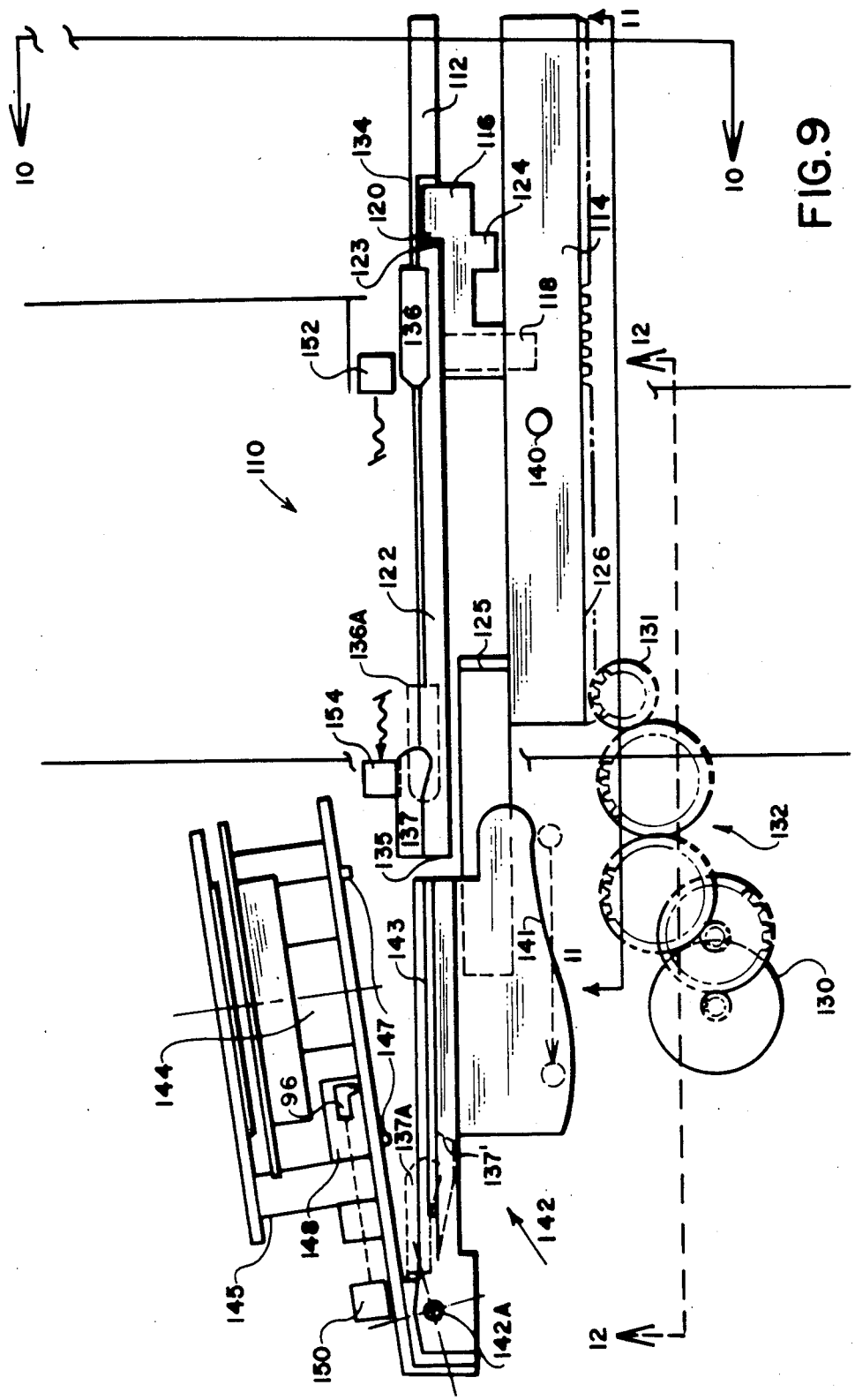
FIG. 9 is a detail plan view of the cartridge shuttle and disk drive shown as part of FIG. 7.
Figure 10:
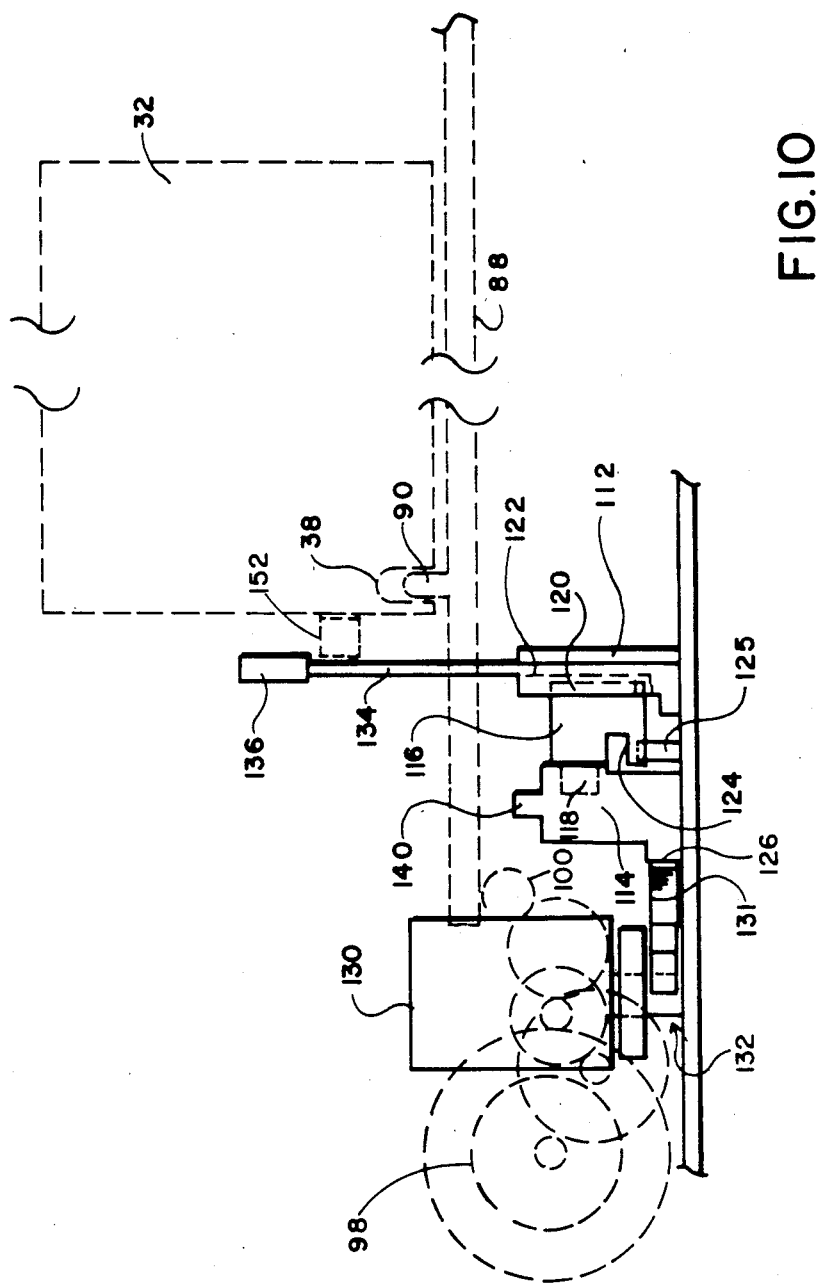
FIG. 10 is a sectional view mainly of the shuttle taken along the line 10—10 of FIG. 9, showing also the relative position of the magazine.

FIGS. 9 and 10 are detail views of the mechanism included within the shuttle transport and disk drive assembly 94 for moving a cartridge out of the magazine 32. Looking first at the shuttle portion 110, it is composed of a first slider 112 and a second slider 114 interconnected by a pivotable latch 116. The latch 116 pivots about a pivot pin 118 and has, at its other end, a hook 120. The first slider 112 has a cavity 122 cut away from one side. The part of the cavity 122 adjacent the hook end 120 of the latch 116 has a notch 123 that engages the hook 120. In the space between sliders 112 and 114 the latch 116 has a bevel edge 124 that, in operation, cooperates with a camming block 125. One side of the slider 114 is formed into a rack gear 126. A shuttle drive motor 130 is connected to a pinion gear 131 by way of a set of reduction gears 132. The pinion gear 131 mates with the rack gear 126. The rotation of the pinion gear 131 causes the movement of the second slider 114 and, by means of the latch 116, the first slider 112.

Figure 11:
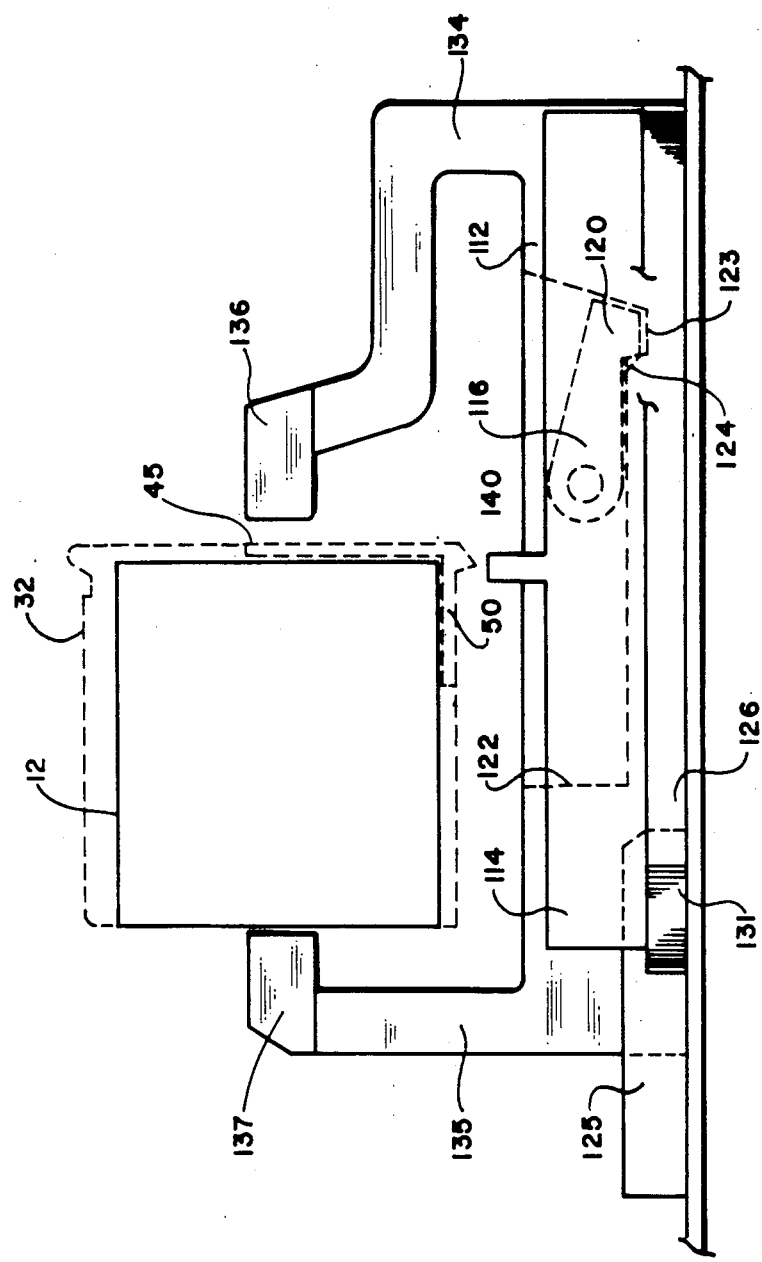
FIG. 11 is a sectional side elevation of the shuttle taken along the line 11—11 of FIG. 9, showing the home position of the shuttle relative to the magazine before a cartridge has been removed.
Figure 12:
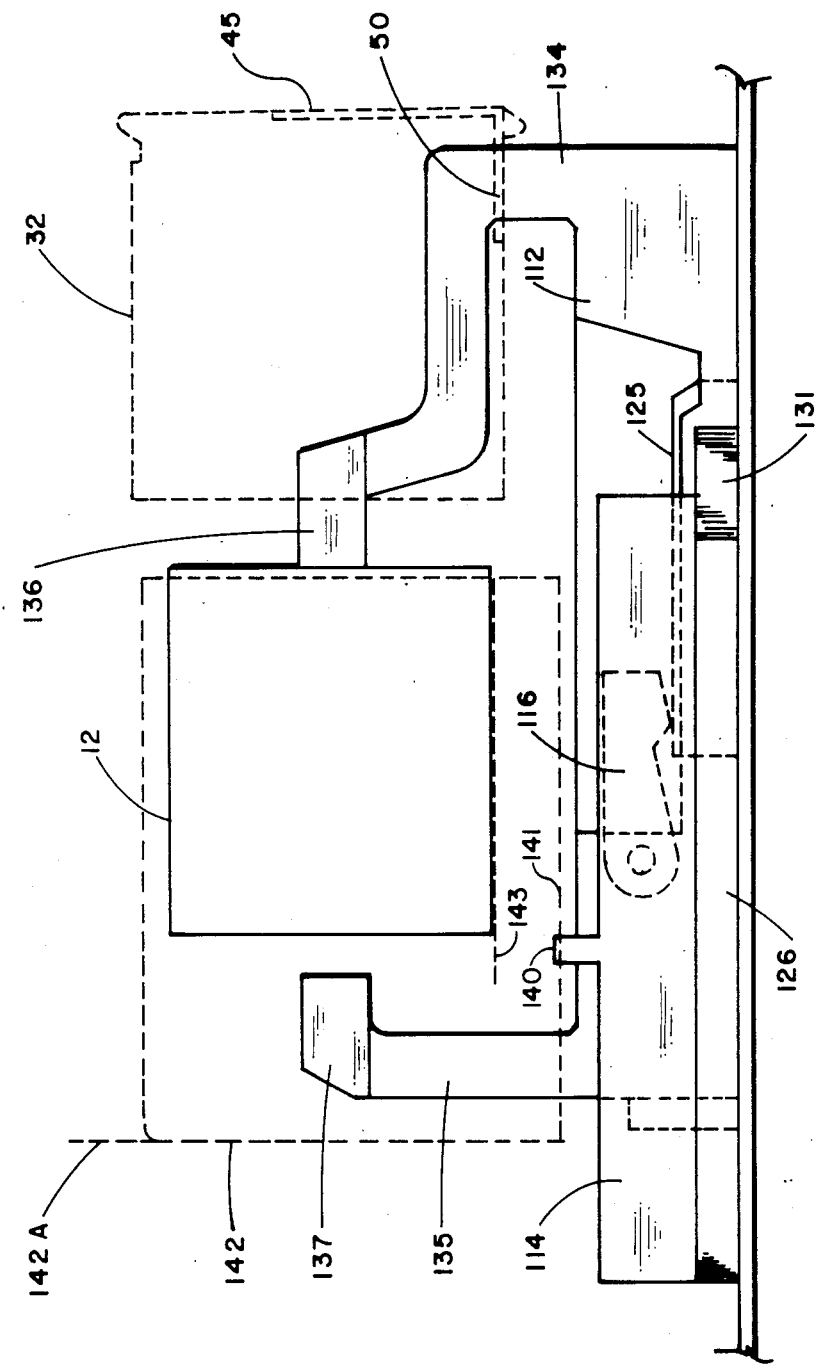
FIG. 12 is a sectional side elevation of the shuttle taken along the broken line 12—12 of FIG. 9, showing the pre-play position of the shuttle relative to the magazine after a cartridge has been removed.

As also seen in FIGS. 11 and 12, the first slider 112 includes a fore blade 134 and an aft blade 135 on which are mounted respective fore and aft pushers 136 and 137. Each pusher has a shaped nose that is adapted to push the cartridge, either from the magazine 32 into a door assembly 142 (shown by FIG. 9) or from the door assembly 142 back into the magazine. The door assembly 142, which pivots about an axis 142A, is biased (by means not shown) into the position shown in FIG. 9. When pivoted, the door assembly 142 moves the cartridge into the playing position depicted as path 94B in FIG. 7. The door assembly 142 is arranged in such a position, as shown by broken line in FIG. 12, that it clears both sliders 112 and 114 and the pusher nose 136. A cavity 137' is cut into the door assembly 142 (as shown by FIG. 9) to accomodate the other pusher nose 137 and the aft blade 135 when the door assembly 142 is fully pivoted.

The second slider 114 also includes a camming pin 140 which is positioned so that, in operation, it engages a camming surface 141 of the pivotable door assembly 142. The door assembly 142 includes a cartridge track 143 aligned with the floor 48 of the magazine 32. A hub motor 144 is mounted on a rigid support 145 at a few degrees with respect to the door assembly 142. One or more alignment pins 147 protrude from the support 145 for engagement with the alignment holes 24 in the cartridge 10 (see FIG. 2). The read-write head 96 is mounted on a head carriage 148 which displaces the head 96 from track to track on the magnetic disk 14. The carriage 148 is connected with a positioner motor 150 by, for example, a lead screw, band positioner, cam drive or the like. The disk drive and head positioner components 144-150 are conventional devices whose selection, installation and operation are within the ordinary skill of one engaged in this art.

When the magazine 32 and its associated memory module 34 is placed into the channel 84 of the player, the switch 91 is tripped. This indicates to the player circuit 80 that a magazine is in place. The magazine 32 is first automatically moved through its full length. While moving, the cartridge storage slots 42 of the magazine pass between a photosensor 152 and a photoreceiver 154 shown in FIG. 9. The signal from the photoreceiver 154 is used to poll the magazine, seeing which slots have cartridges present and which do not. This information is used by the player circuit 80 to validate the data in the memory module 34 concerning which cartridge storage slots 42 are filled with cartridges. The magazine is then brought back to a starting position where the first cartridge slot 42 is lined up along the shuttle path 94A (FIG. 7) and between the nose of the pushers 136 and 137 on the shuttle 110. A side elevation of this position is seen in FIG. 11.

Figure 4:
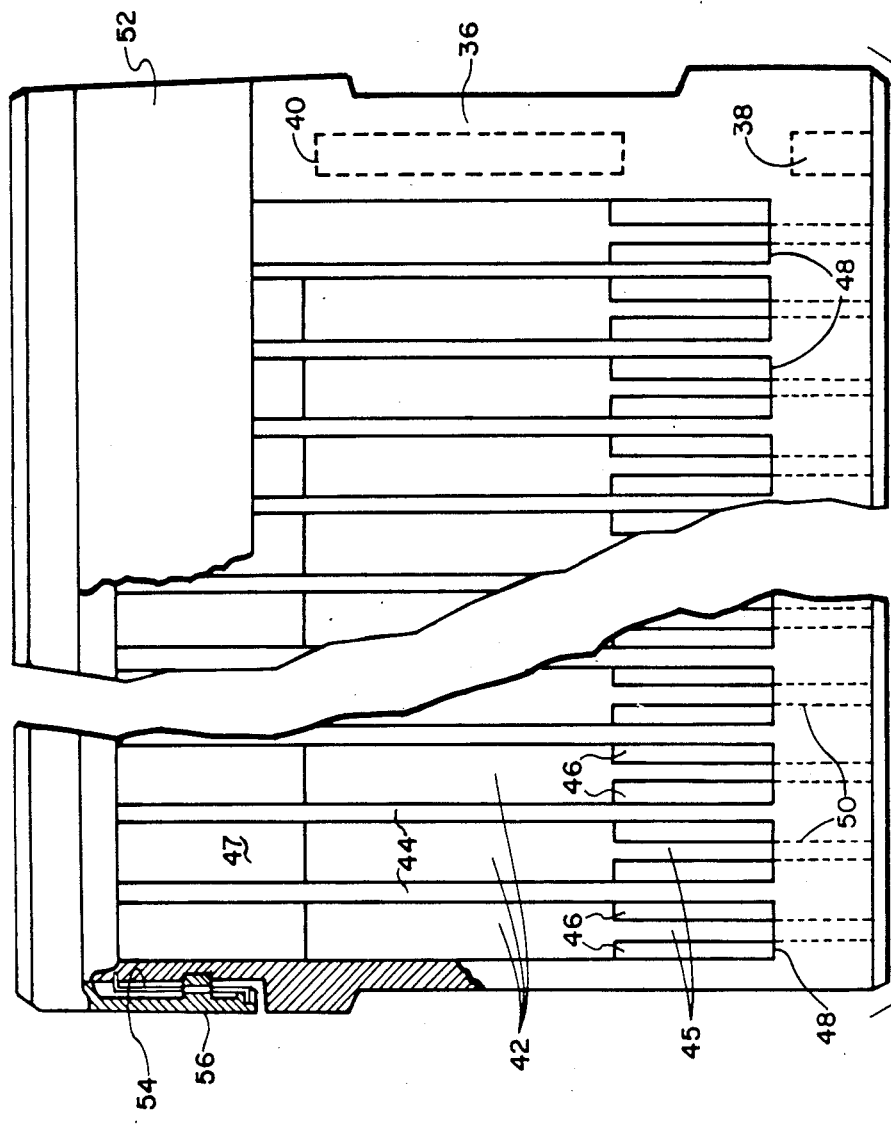
FIG. 4 is a sectional view of a portion of the magazine taken along the line 4—4 in FIG. 3.

The operation of the shuttle transport and disk drive assembly 94 is as follows. The shuttle motor 130 is started, moving the second slider 114 and the first slider 112 therewith. The pusher 136, attached to the first slider 112, begins to push the cartridge out of the magazine. It is shown by FIGS. 11 and 12 how the shuttle 110 passes into the magazine 32 in order to remove a cartridge. In particular, the pusher 136 enters the wider part of the cartridge storage slot 42, as best shown by FIG. 4. The fore blade 134 enters first the narrowed slot opening 45 (FIG. 3) and, later in its travel, also enters the narrowed slot opening 50 on the bottom of the magazine. The pusher 136 ultimately pushes the cartridge to a pre-play position at which the cartridge is upon the cartridge track 143 and opposite—but still offset a few degrees from—the hub motor 144 and the read-write head 96. The pre-play position is seen in FIG. 9 by the unpivoted position of the door assembly 142. At this point, with the motor 130 continuing to drive the second slider 114, the bevel edge 124 of the latch 116 rides up and over the camming surface of the block 125. With the latch 116 pivoted upward, its hook end 120 rides loose from the first slider 112. The first slider 112, along with its blades 134 and 135 and pushers 136 and 137, stops.

Meanwhile, the second slider 114 continues to advance, forcing the camming pin 140 into engagement with the camming surface 141 of the door assembly 142. The slider 114 advances further until the camming pin 140 forces the door assembly 142 to pivot toward the hub motor 144, permitting the spindle (not shown) of the disk drive 144 to positively engage the hub 22 of the disk 14 (FIG. 2). The alignment pins 147 simultaneously position the disk 14 relative to the read-write head 96. A suitable switch (not shown) is provided to signal the circuit 80 that the shuttle drive motor 130 should be turned off and that the disk 14 is ready for read-write operation. (If the cartridge has the shutter 18, a suitable detent is provided to catch the top of the shutter and open it, for example, as the cartridge is pushed into the door assembly 142). The operation is reversed in order to back the cartridge off the disk drive 144 and push it back into the magazine 32. Another switch (not shown)

may be provided to show that the shuttle 110 is in its home position (FIG. 11), and the cartridge is back in the magazine 32. Then the magazine drive motor 98 can be turned on and the rack 88, and the magazine 32 therewith, advanced to a new position relative the shuttle 110.

Figure 13A:
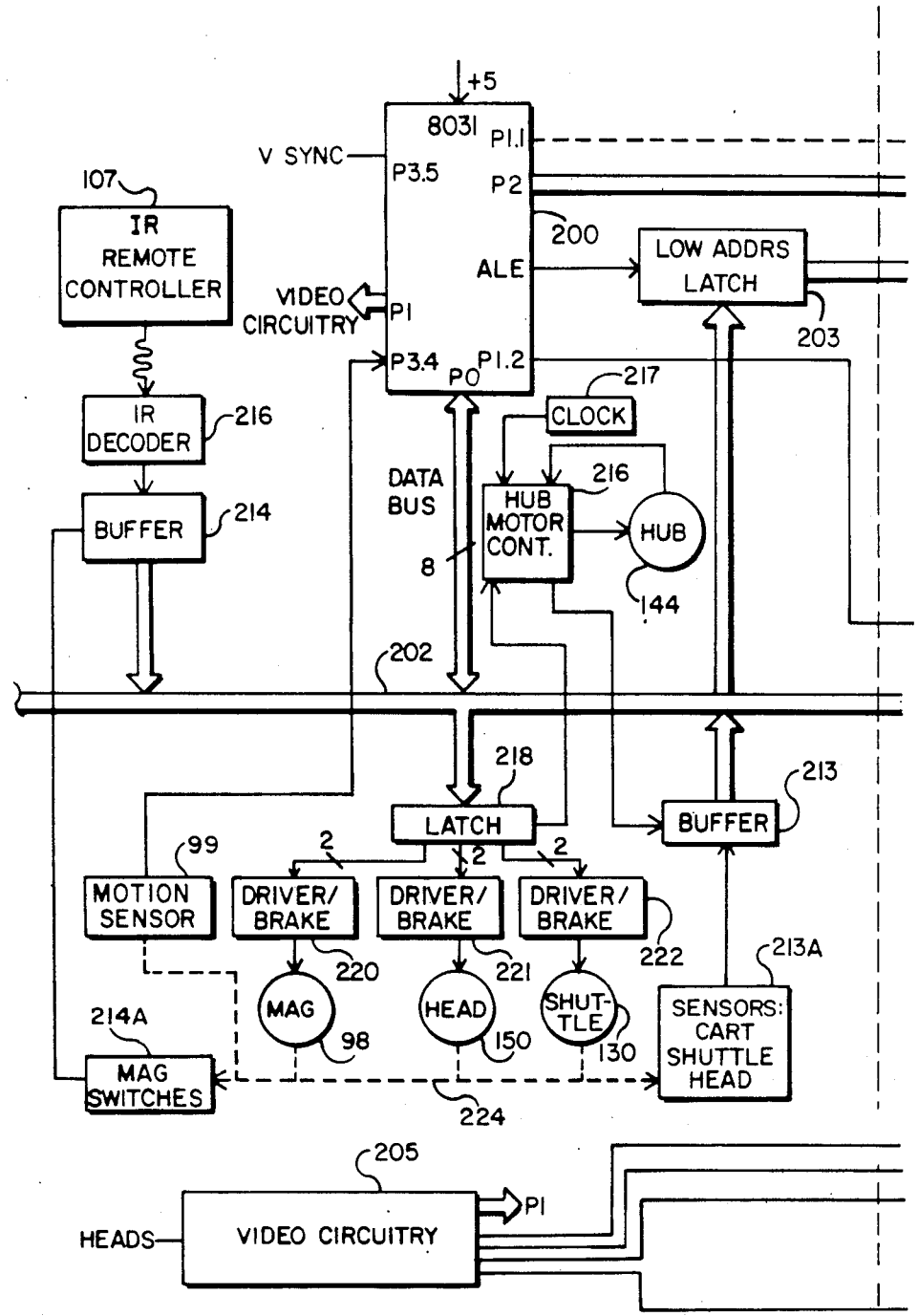
FIGS. 13A and 13B show a detailed circuit diagram for the video disk player shown by FIG. 7.
Figure 13B:
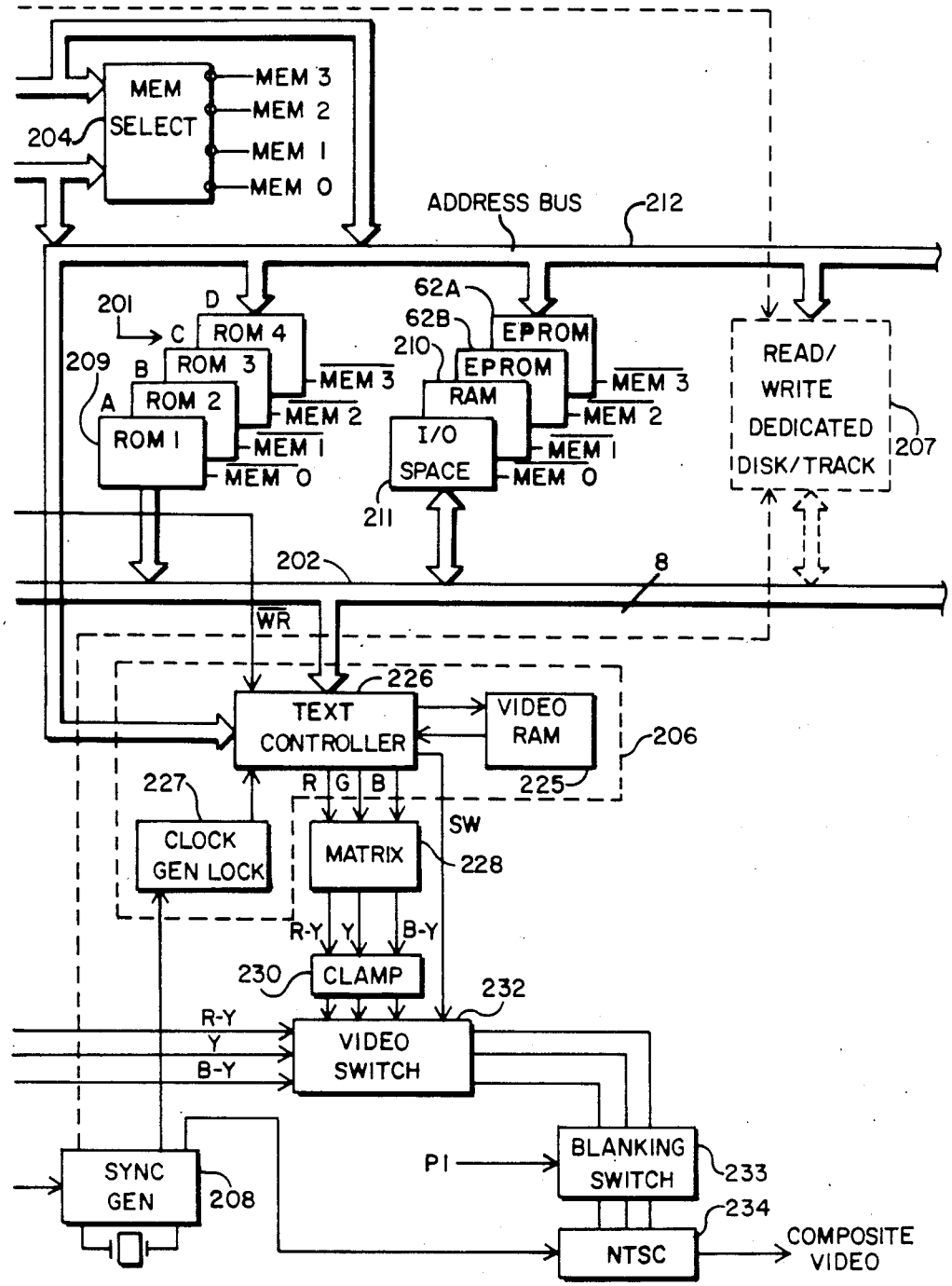
Figure 14:
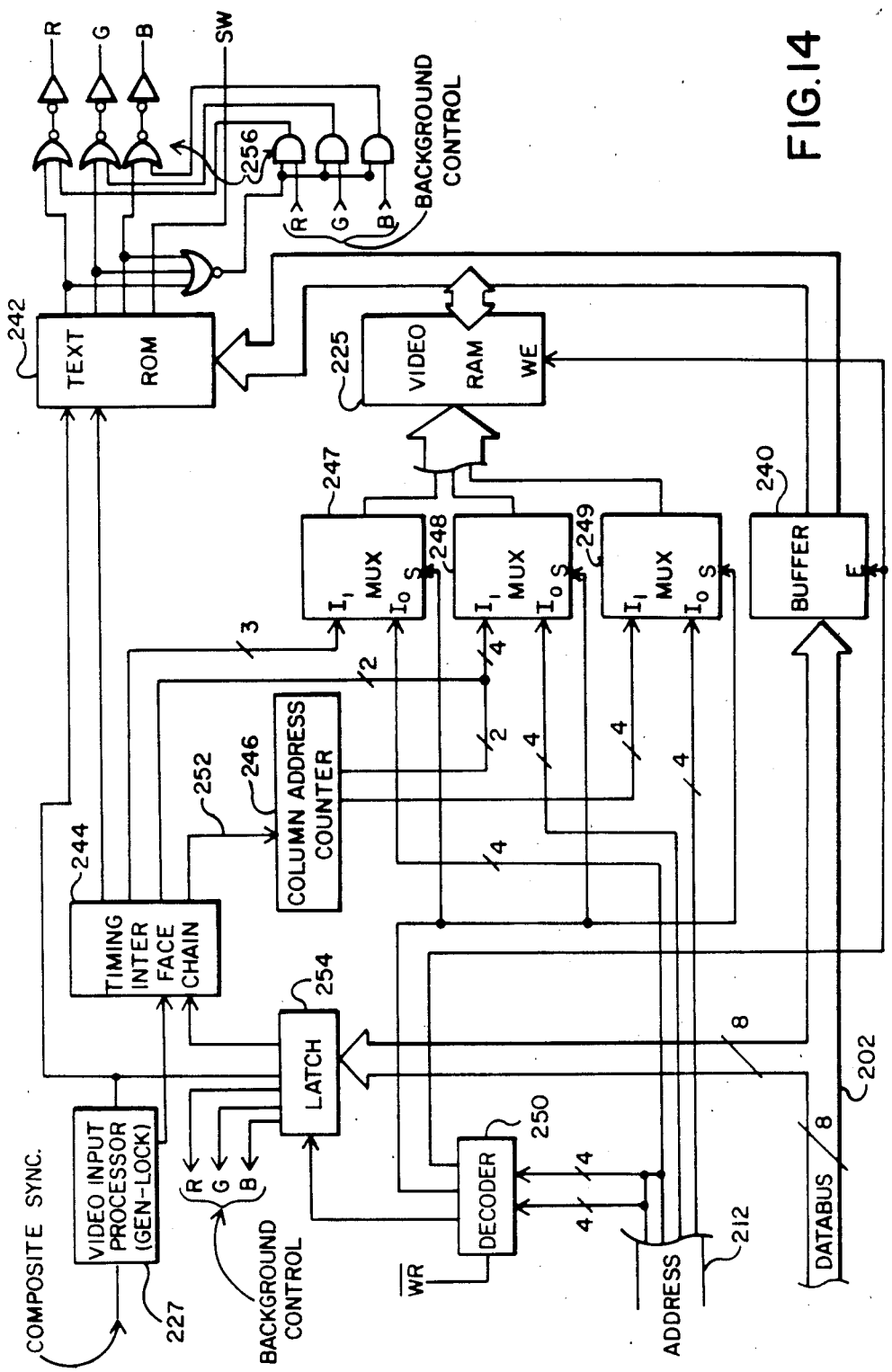
FIG. 14 is a detailed schematic diagram of the video text generator shown as part of the circuit diagram in FIG. 13.
Figure 15:
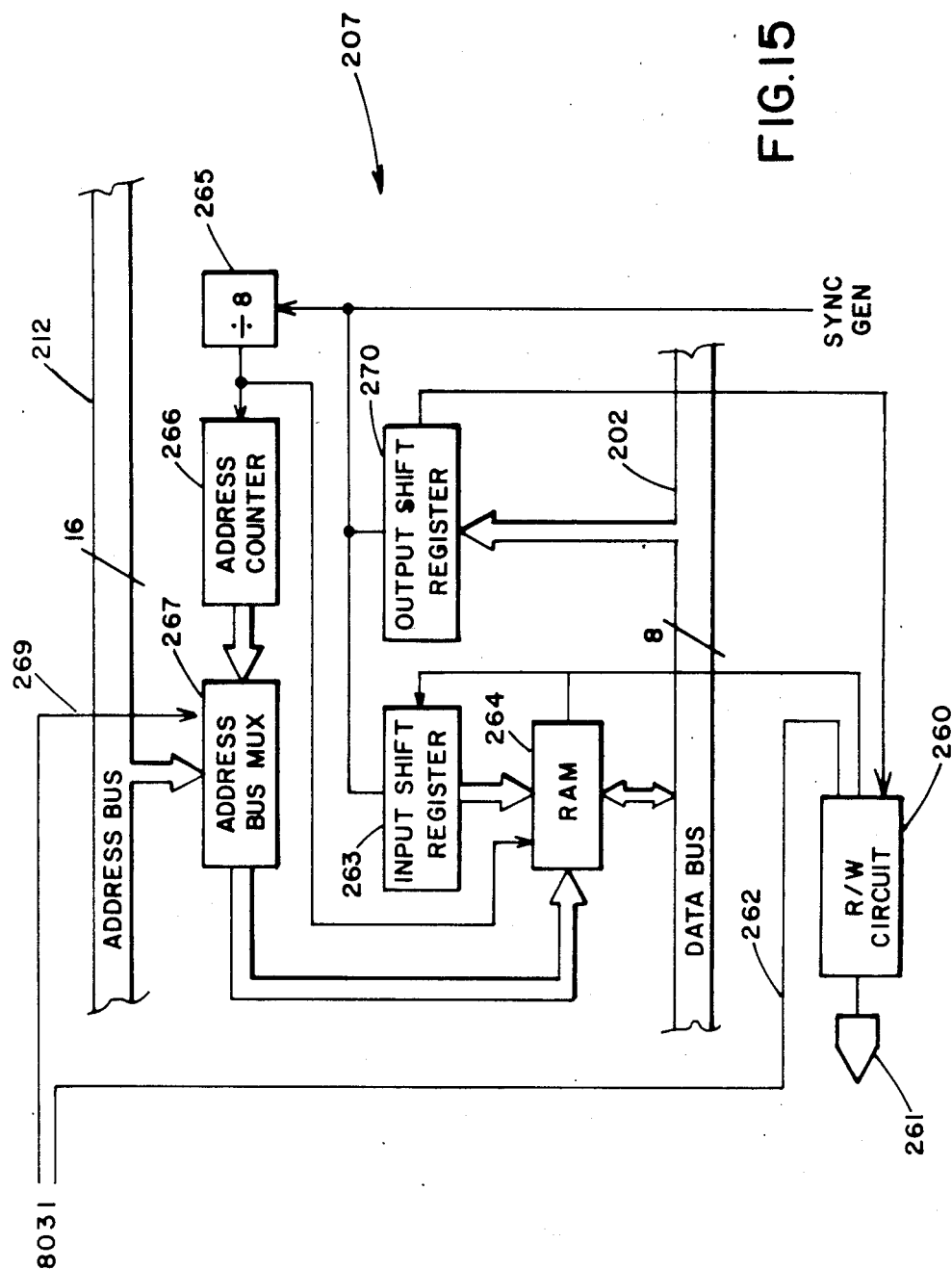
FIG. 15 is a detailed schematic diagram of elements that are added to the circuit diagram of FIG. 13 in order to read and write supplementary data from and to a dedicated track on a video disk.

The player circuit 80 shown in FIG. 7 is further represented in detail by the circuit of FIGS. 13A and 13B. FIGS. 13A and B furthermore include the hand controller 107, the data connections shown separately in FIG. 7, and the motors, switches and sensors associated with parts of the video disk player illustrated in FIG. 7 and the succeeding Figures. FIGS. 14 and 15 provide further detail on certain features of the circuit of FIGS. 13A and B. To aid in understanding certain parts of these Figures, some circuit elements are described as specific devices, including specific device nomenclature; however, other standard circuit devices may be readily substituted for such named devices.

The player circuit is organized around a microcomputer 200, such as the 8031 microcomputer manufactured by the Intel Corporation, and a memory array 201 including the EEPROMs 62A and 62B. The 8031 microcomputer has 32 input/output (I/O) lines configured as four 8-bit parallel ports, labelled P0, P1, P2 and P3—and subdivisions thereof, e.g., P1.0 for the first line of the eight-bit port P1, P1.1 for the second line and so on. Port P0 connects to an 8-bit data bus 202 and provides for multiplexing both a low-order address byte and data onto the bus. The low-order address byte is latched off the data bus 202 and put on a 16-bit address bus 212 when a low address latch 203 is enabled by the address latch enable (ALE) line of the microcomputer 200. The high-order address byte is provided by the eight-line port P2 to the address bus 212 and a memory select decoder 204. One of the four outputs—MEM 0 to MEM 3—of the decoder 204 is driven low by the condition of the address lines put into the decoder 204. The outputs MEM 0 to MEM 3 connect to the chip enable inputs of respective memories within the memory array 201 and, when low, activate the respective memories for a read/write operation. The particular memory selected is a function of the output of the decoder 204 and the conditions of additional lines (not shown) from the microcomputer 200, i.e., the external data memory read and write strobe lines and the program store enable line.

The memory array 201 includes a set of read-only memories (ROMs) 209A . . . 209D for storing the operating programs and a word library for text generation. Read and write memories include the aforementioned EEPROMs 62A and 62B, a random-access memory (RAM) 210 and input/output (I/O) space 211 for memory-mapped I/O, that is, an area of memory space dedicated to memory addresses that are actually used to address peripherals (such as motors and sensors). Each memory in the array 201 is connected to the address bus 212 and to the data bus 202. ROMs 209A to 209D and the RAM 210 have, for example, 2K×8 or 4K×8 capacities. Depending on the capacity needed for the memory module 34, the EEPROMs 62A and 62B may be 2K×8 (for example, a Xicor X2816A device) or 8K×8 (for example, a Xicor X2864A device).

The eight-bit port P1 of the microcomputer 200 serves several purposes in the player circuit. Several lines are used to interchange data with a video circuit 205, which processes video and control data either read from or written (i.e., applied) to the magnetic disk 14.

The video circuit 205 is conventional; since it is not crucial to a description of the generation and operation of the video picture file according to the invention, it will not be described in detail. One bit of the port P1—P1.2—forms a write (WR) pulse to a text generator 206. Another bit of the port P1—P1.1—forms an enable pulse to an auxiliary dedicated track circuit 207, shown in broken lines, which is optional and not part of the preferred embodiment.

The fourth eight-bit port P3 serves various special functions characteristic of the 8031 microcomputer, including that of two 16-bit timer/counters incorporated within the chip and the read and write strobe lines (mentioned earlier). Port P3.4 receives pulses from the motion sensor 99. These pulses indicate motion of the magazine 32 as it is advanced through the channel 84. Port P3.5 receives vertical synchronization pulses from a sync generator 208 connected to the video circuit 205.

Input data regarding the condition of the player and the remote controller 107 is asserted onto the data bus by buffers 213 and 214. The buffer 213 is used to buffer signals from sensor block 213A indicating the state of the "bridge present" optical sensor 154, and the two or more switches (not shown) that report on the position of the shuttle 110 and the magnetic head 96. The buffer 213 also receives a signal from a hub motor control 216 indicating that the hub motor 144 is locked on speed by feedback through the motor control 216 and with reference to a clock source 217. The other buffer 214 asserts signals onto the data bus 202 from the hand controller 107 and the magazine switches 84 and 91 (joined in the magazine switch block 214A in FIG. 13A). The handheld controller 107 emits infrared radiation that is modulated to indicate which button the viewer is depressing—frame forward or reverse, magazine forward or reverse, select, edit or on/off. The infrared signal is detected by an infrared decoder 216, which has a unique decoded output corresponding to each of the controller instructions. The decoded output line drives a corresponding input line of the buffer 214. The buffers 213 and 214 are enabled by lines (not shown) from the microcomputer 200 at the appropriate moment, at that time asserting their input states onto the data bus 202.

Output signals for operating the hub motor 144, the magazine motor 98, the head motor 150 and the shuttle motor 130 are latched off the data bus 202 by a latch 218 (according to the condition of a line—not shown—from the microcomputer 200). A two-bit control signal is provided to respective driver/brakes 220, 221 and 222 which connect to the magazine motor 98, the head motor 150 and the shuttle motor 130. The control signal represents four conditions—forward, reverse, off and brake—for each of the motors. The hub motor control 216 also receives a one bit "ON-OFF" signal from the latch 218. FIG. 13A also shows that the motors 98, 150 and 130 are electromechanically related (by broken line 224) to the sensors and switches in blocks 213A and 214A and the motion sensor 99. That is, movements of the respective motors will cause certain of the switches to trip or the sensors to emit pulses.

The text generator 206 comprises a video RAM 225, a text controller 226 and a clock-gen lock circuit 227. (A gen lock circuit is a conventional system of regenerating synchronizing pulses and a master clock from a composite video source.) The text generator 206 assembles, according to instructions from the microcomputer 200, text messages for display on the television 105 (FIG. 7). Some of the text messages (edit messages) lead the viewer through an editing routine during which the album displays are prepared. Other text messages, for example, take care of "houskeeping" matters or let the viewer select an already-edited album display for automated viewing. The text messages generated by the text generator 206 are viewer-interactive, that is, the messages pose questions and choices which are answered by the viewer through the hand-held remote controller 107. In this manner the viewer is stepped through a predetermined sequence necessary, for example, to edit the pictures or to initiate the viewing of a particular album.

The text controller 226 generates red, green and blue line scan (RGB) signals and a switching signal SW. The RGB signals are connected to a conventional matrix circuit 228, which generates two color-difference signals R-Y and B-Y and a luminance signal Y. The dc component of the color difference signals R-Y and B-Y and the luminance signal Y is restored by a clamp 230, which cause the black tips of the signals to be fixed at a predetermined level. The clamped signals —representative of text— are introduced to a video switch 232, which also receives picture signals from the video circuit 205. The switching signal SW from the text controller 226 determines which set of video signals the switch 232 will transmit, i.e., text video or picture video. The transmitted signals are put through a blanking switch 233 to an NTSC generator 234, which puts out a composite video signal in NTSC format suitable for application to, and viewing on, the television 105 (FIG. 7). The blanking switch 233, which is controlled via port P1 of the microcomputer 200, cuts the video out when cartridges are changed, thus ensuring a blank (black) screen.

FIG. 14 is a detailed illustration of the text generator 206 shown in FIG. 13B. The video RAM 225 has capacity for 24 lines of text, each line having 40 columns of characters. The text data is partially assembled into word segments in a word library stored in one or more of the ROMs 209A, B, C or D (FIG. 13B). The word segments are connected together to form a particular message by conventional text programming of the microcomputer 200. A stream of the assembled and connected word segments are passed through the data bus 202 to a buffer 240, which —when enabled— presents the stream of word segments to the video RAM 225. Address locations for writing these word segments into the video RAM 225 are generated by the text program and asserted onto the address bus 212. The text message stored in the video RAM 225 is read out to a conventional text ROM (TROM) 242, such as a Phillips SAA5055. The text ROM 242 generates the dot pattern necessary for displaying the message on a television screen. The row/column addresses for reading out the message from the video RAM 225 are generated by a timing interface chain 244, such as a Phillips SAA5025, and a column address counter 246.

Since two sets of addresses are provided to the video RAM 225, one for writing word segments in and another for reading them out in a line scan sequence, it is necessary to keep them distinct and switch them to the video RAM at the proper time. A set of multiplexers 247, 248 and 249 provide that function. Twelve address lines, in 4-bit groups, are brought from the address bus 212 to respective $I_o$ inputs of the multiplexers 247, 248 and 249. Eleven address lines, in 3 groups, are brought from the timing interface chain 244 and the column address counter 246 to the $I_1$ inputs of the respective multiplexers 247, 248 and 249. The proper time for switching between the $I_o$ and $I_1$ inputs is determined by a dual 1-of-4 decoder 250, which takes for its input two 4-bit wide inputs from the address bus 212. When set accordingly by the microcomputer 200, these two 4-bit inputs trigger the switch (S) inputs to the multiplexers 247, 248 and 249 and the enable (E) input to the buffer 240. At this time the write addresses from the address bus 212 are presented to the video RAM 225 and the stream of word segment data in the data bus 202 is written into corresponding storage locations. At other times, without the trigger pulse from the decoder 250, the read addresses from the timing interface chain 244 and the column address counter 246 are coupled through the multiplexers 247, 248 and 249 to the video RAM 225 and the stored word segment data is sent to the text ROM 242. The row address is set by five lines from the timing interface chain 244; at the same time a clock signal on the line 252 triggers the column address counter 246. The column addresses are then counted out for the 40 columns of a row by the column address counter 246 which, at the end of the line, is reset to start over on the next line, and so on through the 24 lines.

It is necessary to lock the text message to the timing of the picture video. This is done by the gen-lock circuit 227, which in FIG. 14 is shown to be a video input processor chip, such as a Phillips SAA5030. It is also desirable that the text generator 206 only control the video display during that part of the overall display time for which there is actual text. Ordinarily actual text may occupy only a small part of the available picture display; other parts of the display are devoted to, for example, display lines that separate lines of text. At these times, when no text is being shown, it is desirable to fill in the remaining display area with, say, an appealing color. This is done by latching a "no-text" color signal off the data bus when a latch 254 is clocked by a line from the decoder 250. This signal consists of "background" red, green and blue signals which are substituted for the R, G, B signals from the text ROM 242 during that part of the display time for which there is no text. The substitution is made by a configuration 256 of AND, NOR and inverting gates when the output lines of the text ROM 242 are simultaneously low (i.e., meaning no text signal is present).

FIG. 15 shows detail of the auxiliary dedicated track circuit 207, shown by broken line in FIG. 13B. This circuit is used if some data regarding the video pictures is stored on a separate track on the magnetic disk 14. The track circuit 207 provides an additional read/write (R/W) circuit 260, including one or more read/write heads 261, to sense the data on the separate track and to add additional data if so desired. In practice the read/write circuit 260 may be incorporated within the video circuit 205, even to the extent of using the same read/write heads. Data read by the circuit 260, under control of the microcomputer 200 by means of one or more lines 262, is presented to an 8-bit input shift register 263 as a serial data stream. Eight-bit segments or words of the data stream are shifted serially into the shift register 263 and then loaded in parallel into a RAM 264. Then 8 more bits are shifted in and loaded into the RAM 264 (in a different memory location), and so on until the entire dedicated track is read.

The microcomputer initiates this read process but, once started, the process continues to completion under the hardware control of the circuit 207. Hardware control is effected by a divide-by-8 counter 265, an address counter 266 and an address bus multiplexer 267. The divide-by-8 counter 265, which is locked to the sync generator 208 (FIG. 13B), provides pulses for triggering the address counter 266 through an address cycle. Meanwhile, the sync pulses—coming at 8 times the rate of the pulses to the address counter 266—act as clock pulses to shift each eight-bit word into the input shift register 263. When all eight bits are in the register 263, the address counter 266 sends a storage address through the multiplexer 267 to the RAM 264. The 8 bits are then written into the RAM 264 and the cycle is restarted. When all the data has been read from the dedicated track, a signal is sent on the lines 262 from the R/W circuit 260 to the microcomputer. A switching signal is then returned by the microcomputer 200 on a line 269 to the multiplexer 267, cutting off hardware control from the address counter 266 and connecting the multiplexer to the address bus 212. Now under microcomputer control, the track circuit 207 receives addresses from the address bus 212, which cause data stored in the RAM 264 to be read onto the data bus 202.

The process is basically reversed in order to write data onto the dedicated track. Eight-bit data words are loaded in parallel into an output shift register 270 from the data bus 202, while the circuit 207 operates under computer control. Then the hardware of the track circuit 207 takes control and shifts a serial 8-bit data stream from the output shift register 270 to the R/W circuit 260 and the heads 261. As before, the shift clock is provided by the sync pulses coming from the sync generator 208. The microcomputer 200 is then notified when another word can be loaded into the shift register 270, control is switched to the microcomputer 200, and the process is repeated.

The player circuit of FIGS. 13A and B controls the organization and use of the video picture file by a video file operating system. This system steps the viewer through a prearranged sequence of operations. Several modes of operation are available, including the "set-up" mode, the "edit" mode, the "album viewing" mode and the "normal viewing" mode. Each mode interacts the viewer with the video file operating system. Such interaction is characterized by video messages put on the television 105 in the form of what are referred to herein as "screens". The description of the various "screens", when they are called up, and what the viewer does with them constitutes a list of requirements for the video file operating system, that is, a specification for the system. This specification is the basic document from which a computer program is written. A computer programmer of ordinary skill can take this specification and design the appropriate program to fulfill the requirements set out therein. The statements used in the program will depend upon the approach taken by the individual programmer but the process is straight-forward and does not require experimentation in design.

The alpha-numeric format of each "screen" is assembled by the text generator 206 from alpha-numeric word segments stored in the memory 201, as discussed in connection with FIGS. 13A and B and 14. Each "screen" lists choices which the viewer may make from the seven-button hand controller 107. A graphic cursor (depicted herein as an asterisk "*") is moved by the viewer from buttons on the hand controller 107 and points to the particular choice up for consideration. Pressing the correct button on the hand controller 107 enters the choice to the operating system. Five of the buttons—magazine forward or reverse, frame forward or reverse, and select—grant the viewer complete control of all operating modes in the video picture file. Depending on the mode, some of the buttons will perform different functions than their name would indicate. For example, during editing the cursor is moved by pressing the magazine forward or reverse buttons, respectively. During viewing the magazine is moved by the same buttons. A sixth button is an exit key which will unconditionally pass control to a particular "screen" called the "menu screen", regardless of present operation. The last button is an on/off switch for the player (whose actuation depends on the completion of certain pre-shutdown tasks, like moving the magazine back to its loading position).

After the magazine 32 is inserted and checked for cartridges, the video file operating system first enters the "set-up" mode by displaying a "set-up screen" on the television. The "set-up screen" lists a choice of fundamental operating parameters, as follows:

| SKIP FRAME | [ON/OFF] | (1) |
|---|---|---|
| PHOTO ID | [ON/OFF] | |
| TEXT | [ON/OFF] | |
| *PICTURE DATA | [ON/OFF] | |
| VIEW TIME | [ON/OFF] | |
| CONTINUE TO MENU | [ON/OFF] | |

The existing condition of the parameters is that last set by the viewer and stored in the memory module 34. It appears on the screen in a different color. Should the user wish to change a parameter, the cursor is moved adjacent the parameter to be changed, and the select button on the hand controller 107 is pressed. Pressing the select button will either enable or disable the parameter, depending on its prior status. Each time a set-up parameter is changed, the new condition is stored in the memory module 34.

When the "skip frame" parameter is ON, the video file operating system will bypass any picture previously edited to "skip frame" (a description of editing comes later). When "skip frame" is OFF, all pictures will be displayed in the order that they appear on the disk, or in the album. When the "photo ID" parameter is ON, the disk number and the frame number of the current picture appear on the television with the picture. When OFF, they will not appear. When the "picture data" parameter is ON, the video file operating system will examine the picture track of the picture currently on display; any data embedded within the picture track (on a buried sub-carrier, for example) will be displayed with the picture. Such data is ordinarily placed in the track when the picture is taken, and may include the date on which the picture was taken, taking conditions, and so on. When "picture data" is OFF, the data does not appear. When the "text" parameter is ON, text messages associated with particular pictures—like titles or descriptions—are displayed. These text messages are stored in the memory module 34; unlike picture data, such text messages are written into the memory module 34 after the picture is taken by a previous editing operation, which is also controlled by the video file operating system. When the "view time" parameter is ON, and the player is in an album viewing mode, the video file operating system automatically displays each picture for a time previously selected and then advances to the next picture in the album. However, the present viewing time is overriden for a given picture by pressing the magazine or frame buttons on the hand controller 107.

The last choice in the "set-up screen" is "continue to menu", which produces the "menu screen" and enables the viewer to select a mode of operation.

The viewer sees the "menu screen" after exiting from the "set-up" screen. The "menu screen" lists the choices of operating modes, as follows:

| SET UP | (2) |
|---|---|
| *EDIT | |
| ALBUM VIEWING | |
| NORMAL VIEWING | |
| MAGAZINE TO UNLOAD POSITION | |

Each mode is selected by positioning the cursor and pressing the select button, just as before. The "set up" mode is the one just described; it may be desirable for the viewer to go back to it from time to time while interacting with the operating system. The "edit" mode permits the viewer to partition the pictures on the magnetic disks contained in the magazine into albums. The same pictures may be assigned to different albums, text may be added to the pictures, and the order of viewing may be varied from the order of appearance on the disks. The "album viewing" mode enables the viewer to select a particular album for viewing (of those already edited) while the "normal viewing" mode displays each picture without regard to album assignment. The last operating mode, that of "magazine to unload position", causes the magazine to cycle to its unload position so that it can be removed from the player. This mode is automatically entered when the OFF button is pressed on the hand controller 107. Pressing the exit button on the controller 107 at any time when the "menu screen" is not being displayed always returns the viewer to the "menu screen". Each of the first four modes will now be considered in detail.

The "edit" mode has five levels of editing. When the "edit" mode is selected from the "menu screen", an "edit option screen" is shown, listing the five editing levels, as follows:

| *DISK EDIT | (3) |
|---|---|
| PICTURE EDIT | |
| ALBUM EDIT | |
| TEXT EDIT | |
| RENAME | |
| EXIT TO MENU | |

When the "disk edit" level is selected, a "disk selection screen" appears on the television with the following message:

| *Pressing select will begin Viewing Disk [#] | (4) |
|---|---|
| exit to menu | |

The disk number [#] is increased or decreased by repeatedly pressing the magazine forward or reverse button on the hand controller 107. When the desired disk number comes up, the select button is pressed and the "edit screen" appears on the television. This "screen" shows a cropped portion of the first picture of the selected disk and an album menu, as follows:

| PICTURE AREA | | | |
|---|---|---|---|
| *ALBUM 1 | ALBUM 9 | ALBUM 17 | (5) |

| PICTURE AREA | | |
|---|---|---|
| ALBUM 2 | ALBUM 10 | ALBUM 18 |
| ALBUM 3 | ALBUM 11 | ALBUM 19 |
| ALBUM 4 | ALBUM 12 | ALBUM 20 |
| ALBUM 5 | ALBUM 13 | SKIP |
| ALBUM 6 | ALBUM 14 | VIEW |
| ALBUM 7 | ALBUM 15 | EXIT |
| ALBUM 8 | ALBUM 16 | |

The album menu at the bottom of the picture includes a list of twenty possible albums to which the picture may be assigned, as well as certain other possible actions such as "skip", "view" and "exit". The albums to which the picture is already assigned are shown in a different color. A picture is filed in another album (or deleted from an already assigned album) by moving the cursor to the selected album name and pressing select; then the selection is stored in the memory module 34 and the disk is stepped to the next picture. Pressing the select button while the cursor points to "skip" enters the picture into the "skip frame" category already discussed in connection with the "set-up screen" (screen (1)). The "skip frame" selection is also stored in the memory module 34. Pressing the select button while the cursor points to "view" causes the album menu at the bottom part of the screen to be replaced with the remaining part of the picture so that the viewer can see the entire picture before deciding which album(s) to put it in. Pressing the select button while the cursor points to "exit" returns the "edit option screen" (screen (3)) to the television so that the viewer can select a different level of editing.

The "picture edit" level is used if the viewer wants only to look at pictures that have not been previously edited into an album. Pressing the select button while the cursor points to "picture edit" causes the "disk selection screen" (screen (4)) to appear on the television. After the desired disk number comes up on the screen, pressing the select button causes the first unedited picture on the selected disk to appear on the television. The picture is cropped with the album menu appearing at bottom, as shown by the screen (5). The album selection process is identical to that of the "disk edit" level. Pressing the frame forward or reverse buttons will then increment the disk to the next unedited picture.

The "album edit" level is intended for use with pictures that have previously been edited into albums. At this level, the viewer indicates the order in which the pictures will be displayed, the order in which the disks are called, and a display time for each picture (the default order is chronological and the default time is 10 seconds). Pressing the select button when the cursor points to "album edit" causes the "album select screen" to appear on the television, as follows:

| AVAILABLE ALBUMS ARE | | |
|---|---|---|
| *ALBUM 1 | ALBUM 11 | (6) |
| ALBUM 2 | ALBUM 12 | |
| ALBUM 3 | ALBUM 13 | |
| ALBUM 4 | ALBUM 14 | |
| ALBUM 5 | ALBUM 15 | |
| ALBUM 6 | ALBUM 16 | |
| ALBUM 7 | ALBUM 17 | |
| ALBUM 8 | ALBUM 18 | |
| ALBUM 9 | ALBUM 19 | |
| ALBUM 10 | ALBUM 20 | |

-continued

| AVAILABLE ALBUMS ARE |
| --- |
| EXIT TO MENU |

The available albums are listed on the "album select screen" (6). Pressing the select button with the cursor pointing to a selected album brings up a separate message (7) inquiring as to whether picture order, disk order or view time is being determined.

| *PICTURE ORDER (7) |
| --- |
| DISK ORDER |
| VIEW TIME |
| EXIT TO MENU |

The cursor and select button are used as before to answer the inquiry.

Selecting view time causes each picture in the album to appear along with a numeric indication of the current view time. Pressing the magazine forward or reverse buttons causes the numeric indication to cycle up or down through the available time selections. Pressing the frame advance or reverse button when the desired time is showing will enter the view time into the memory module 34 and move to the next or previous picture. Selecting picture order causes the picture numbers of the disk (i. e., those pictures in the selected album) to be displayed in the order in which they would appear in the album across the top of the screen (current order), as follows.

| 1 | | 3 | 4 | 5 | 6 | | 8 9 | 11 12 13 14 15 16 17 | 19 | (8) |
| --- | --- | --- | --- | --- | --- | --- | --- | --- | --- | --- |
| | | | | | * | | | | | |
| 2 | 10 | | | 18 | 7 | | | | | |
| | | | | | * | | | | | |

A space is provided under the "current order" line for the "new order". The cursor is positioned along the "current order" line by using the frame buttons. Pressing the select button when the cursor is underneath a particular picture number causes that picture number to enter the "new order" list in the next available spot. For example, screen (8) shows that "7" has just been moved to the "new order" list. In this way the current picture order is rearranged into a new picture order, which is stored in the memory module 34. Selecting disk order causes a display similar to picture order except the identifying numbers of the disks assigned to the selected album, in the order in which the video file operating system will call them, are displayed instead of the picture numbers. The process of rearranging the order in which the disks are called up is the same as that for picture order rearrangement. The new order is also stored in the memory module 34.

By means of the "text edit" level (of the "edit" mode) one line of text may be assigned to each picture and entered into the memory module 34. When the select button is pressed while the cursor points to "text edit" (on the "edit option screen" (3)) the "disk selection screen" (4) is shown on the television. A disk is selected (in the same manner as done at the "disk edit" level) and the frame forward or reverse buttons are used to cycle to the picture to which text will be added. Pressing the select button again causes an alpha-numeric display in two parts to appear on the television:

| ABCDEFGHIJKLMNOPQRSTUVWXYZ | 0123456789 | (9) |
| --- | --- | --- |
| * | | |
| ENTER | | |
| EXIT | | |
| THE NEW TEXT WILL APPEAR HERE | | |
| | | * |

The upper part lists a set of alpha-numeric characters. The lower part either shows the existing one-line text assigned to this picture or, if no text has yet been assigned, displays a prompting message. Each part has its own cursor, which are moved in sequence by the magazine forward or reverse buttons. To start, the cursor on the upper part is moved to a desired alpha-numeric character. Pressing the select button then enables the lower cursor, which is moved to the position desired for the selected character (the upper cursor is still pointing to the selected character). When the lower cursor is in place, pressing the select button enters the new character into the text and into the memory module 34, deleting any character that may have been there previously, and returns control to the upper cursor for the next new character. In this way an intelligible one-line description is assembled from the set of alpha-numeric characters in the upper part of the screen.

The "rename album" level (of the "edit" mode) permits the viewer to select or change the name of one of the twenty albums in the video file operating system. Pressing the select button with the cursor pointing to "rename album" on the "edit option screen" (3) causes the "rename screen" to be displayed on the television:

| OLD TITLE OOOOOOOOOOOOOOOO | | (10) |
| --- | --- | --- |
| NEW TITLE NNNNNNNNNNNNNNNN | | |
| ABCDEFGHIJKLMNOPQRSTUVWXYZ | 0123456789 | |
| 0 1 2 3 4 5 6 7 8 9 | | |

The "rename screen" (10) is in three parts: an old title part, a new title part and a third part listing a set of alpha-numeric characters. Pressing the magazine forward or reverse cycles the old title part through all twenty albums. (In the absence of a title, the old title shows as "album 1, album 2, album 3, . . . album 20".) Once an old album title is selected, pressing the select button enables a cursor adjacent the alpha-numeric third part, and a title is then assembled in the same manner as text was assembled in the "text edit" level. The album titles are entered into the memory module 34, from which they are retrieved for the next showing of the album identifying screens (5) and (6).

Returning now to a discussion of the other operating modes listed on the "menu screen" (2), selection of the "album viewing" mode (by pressing the select button when the cursor points to that mode on the "menu screen") causes a list of all previously edited album titles to appear on the television, i.e., the "album select screen" (6). The viewer moves the cursor opposite a selected album (by the magazine buttons) and accesses that album by pressing the select button. Then the first picture in that album appears on the television, regardless of which disk it is on. If the "view time" parameter (from the "set-up screen" (1)) is ON, this picture—and each following picture—will be displayed for the time determined during the "album edit" level of the "edit" mode. If no time was determined the display time defaults to 10 seconds. If the "view time" parameter is OFF the pictures will be continuously displayed until either the frame forward or reverse buttons are pressed. Pressing these buttons advances or decrements the disk to the next or preceding picture in the album. Having the photo ID, text, or picture data parameters ON (from the "set-up screen" (1)) causes the corresponding text or data to appear along with the picture. Whether the picture advance is done automatically or manually from the hand controller 107, the disk and cartridge location of the picture is transparent to the viewer, that is, the viewer need not know and will not know (unless the "photo ID" parameter is ON) the order of playback. The effort expended to generate this picture order was done at the "album edit" level of the "edit" mode; it need not be repeated at this time. The pictures included in the album were selected during the "disk edit" and/or "picture edit" levels of the "edit" mode; that work too is done. All the viewer, and anyone else watching, need do is to sit back and enjoy the show.

Figure 23:
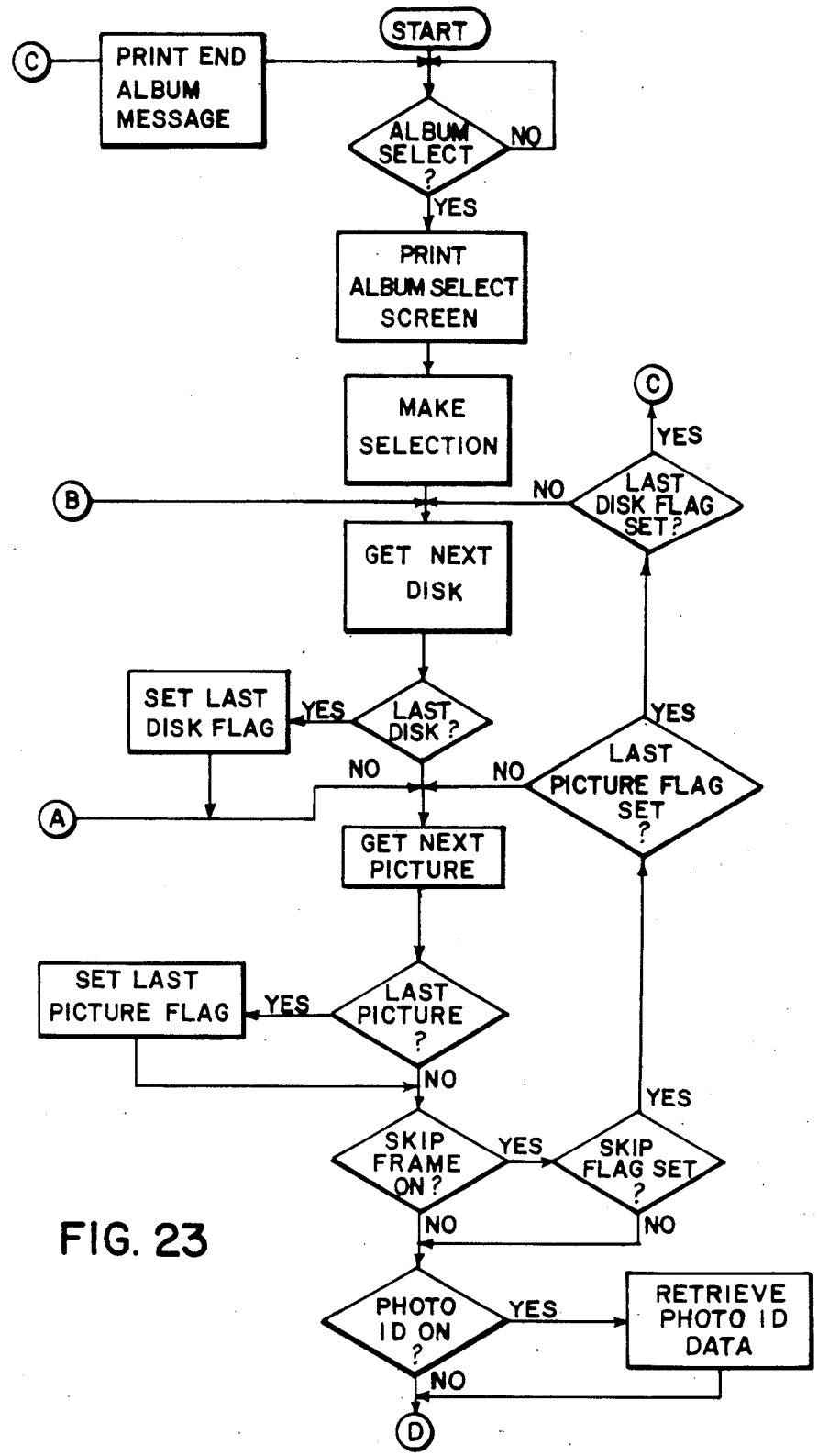
FIGS. 23 and 24 show a flowchart of a typical implementaton of the "album viewing" mode of operation of the circuit of FIGS. 13A and 13B.
Figure 24:
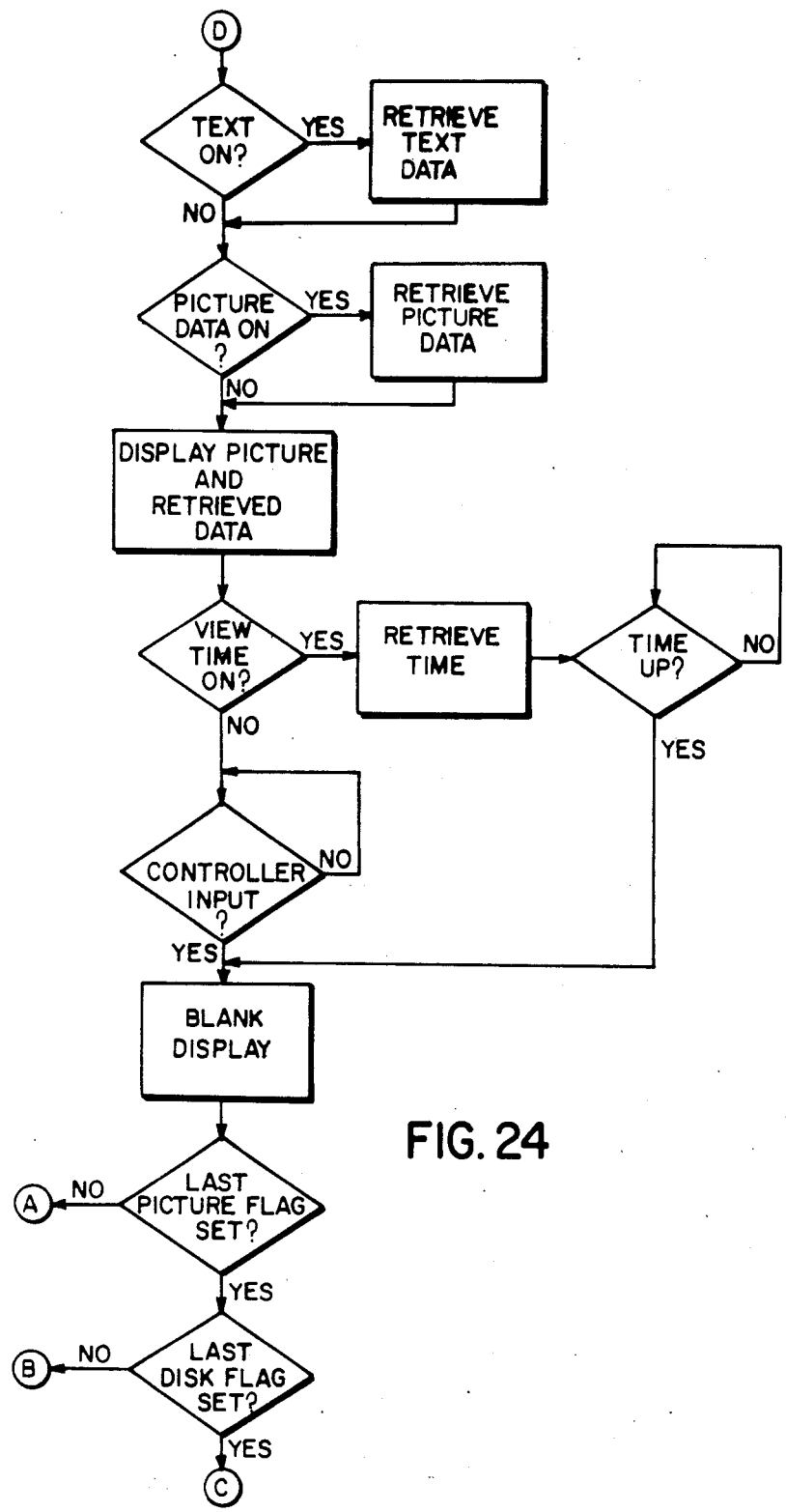

FIGS. 23 and 24 show a flowchart of a typical implementation of the "album viewing" mode. This chart presupposes the storage of a sequential list of picture assignments, according to disk and album, in the memory module 34. For the most part, the chart is self-explanatory. The process begins with the receipt of an ALBUM SELECT signal, which will be described shortly. After the "album select screen" (6) is printed and the viewer makes a selection, the video file operating system begins to cycle through the disks. Each disk and picture is checked to see if it is the last one in the album; if it is, a flag is set and a special course of action is prescribed as shown. For each picture, the fundamental operating parameters specified in the "set-up screen" (1) are checked and, if ON, the corresponding action is initiated. When the album is finished, a message is printed and the system waits for the next ALBUM SELECT signal.

Modifying the existing order of the video picture file is an easy matter. Say for example a new disk is put into the magazine with pictures that relate to the existing albums in the video picture file. The viewer first sees the "set-up screen" (1) as a reminder of existing operating parameters and an opportunity to change them. Then the viewer goes to the "menu screen" (2) and points the cursor to the "edit" mode. Pressing the select button on the remote controller 107 brings up the "edit option screen" (3). The cursor is pointed to the "disk edit" level. Pressing the select button brings up the "disk selection screen" (4). The number of the new disk is entered and select is again pressed. The "edit screen" (5) appears, showing both the first picture (cropped) of the new disk and the list of albums in the video picture file (the names of albums will appear if they have been previously entered). Moving the cursor to the desired album and pressing select enters the new picture's album assignment into the memory module 34 and brings up the next picture, and so on until all pictures in the new disk are examined. The viewer may stop at this point. However, the picture order may be rearranged by going to the "album edit" level and text can be added at the "text edit" level.

There are times when it is desirable to bypass the "album viewing" mode but still retain some of the automatic features of the video picture file. The "normal viewing" mode is provided for that reason. When this mode is selected (by pressing the select button when the cursor is pointing to that mode on the "menu screen" (2)), the "disk selection screen" (4) is displayed and the viewer selects a disk number (refer back to the "disk edit" level for the procedure for doing this). The video file operating system brings the first picture of the selected disk up on the television, displaying also the disk number and the picture number. Pressing the frame forward or reverse buttons advances or decrements the picture display within a given disk. Holding the magazine forward or reverse buttons down causes the video file operating system to cycle through the magazine, not displaying pictures but displaying the disk number of the cartridge in the load position (as shown by FIGS. 7 and 11 for the cartridge aligned with the path 94A). Once the user reaches the desired disk, pressing a frame advance button will move the disk into the play position and display the first picture.

The preceding description relative to the "screens"—and especially how the viewer interacts with them—forms the basis for programming the video file operating system. A programmer of ordinary skill can take this description and, in due course but without undue experimentation, produce the necessary program. In the past, the programmer would devise a set of charts (i.e., flow charts) showing the flow of control through the system as an aid in the step of programming. More recently, a different type of chart showing the flow of data through the system has replaced the traditional flow chart as an aid in designing the program. Whichever programming aid is used, their generation (from the specification) and use is within the capability of the ordinarily skilled programmer. The latter charts are called data flow diagrams; their design and use is part of what is referred to as structured systems design and is thoroughly discussed in such references as *Structured Analysis and System Specification* by Tom DeMarco, New York, NY: Yourdon, Inc., 1978, and *The Practical Guide to Structured Systems Design* by Meilir Page-Jones, New York, NY: Yourdon Press, Inc., 1980. While unnecessary for the ordinarily skilled practitioner of structured systems design, the general reader may benefit from a showing of some typical data flow diagrams for the video file operating system. For that reason the operating system for the player circuit is shown in part by FIGS. 16–22 in terms of a nested set of data flow diagrams.

Data flow diagrams present a network representation of a system from the point of view of the data, rather than the point of view of that which acts upon the data (i.e., as would be presented by a flow chart). Certain conventions are used in a data flow diagram, as follows. A "bubble" is used to portray a process, that is, a place where data is transformed. Named lines (called named vectors) enter and leave the "bubbles". The vectors portray a data path or flow and the names, which are defined in a data dictionary, represent the pieces of data flowing along the data paths. Two parallel lines portray a file or data base; its name is between the lines. Data flow diagrams can partition a system into levels (thus the name, leveled data flow diagrams or top-down analysis). The top level is composed of a context data flow diagram delineating the domain of the system. Each "bubble" in the context diagram is expanded into a child diagram, each "bubble" in the child diagram into a further child diagram and so on until a child level of unpartitioned "bubbles"—called functional primitives—is reached. The basic rule of construction is that every data flow entering and leaving the perimeter of a given child diagram must be represented in its parent diagram. Using the data flow diagrams, the data dictionary and the rules and objectives spelled out in the specification, it is a straight-forward matter to write the statements of the program executed by each "bubble". This may be done directly in the chosen programming language or by means of well-known intermediate steps such as structured English.

Figure 16:
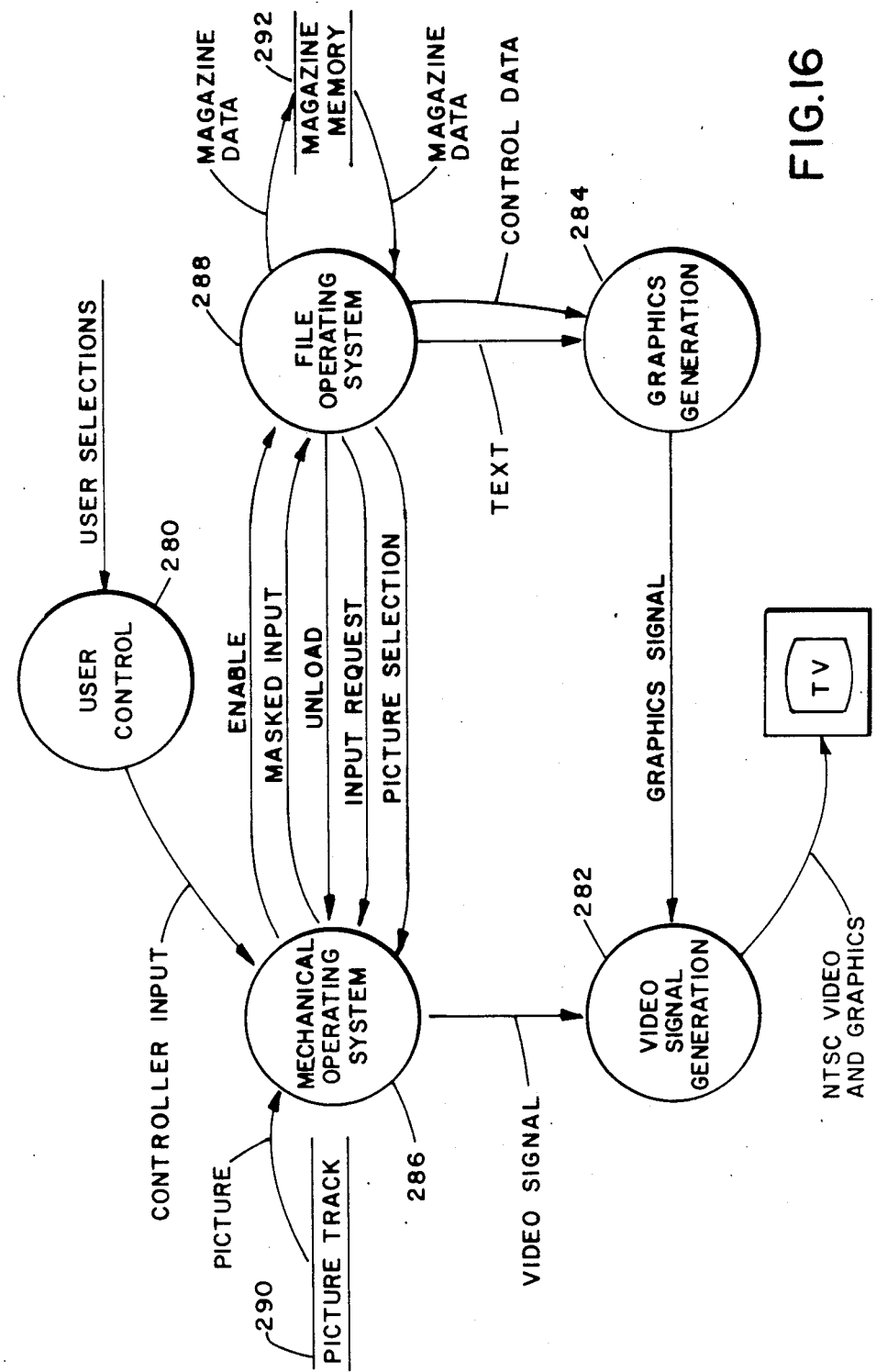
FIG. 16 is the overall data flow diagram for the circuit diagram of FIGS. 13A and 13B.
Figure 17:
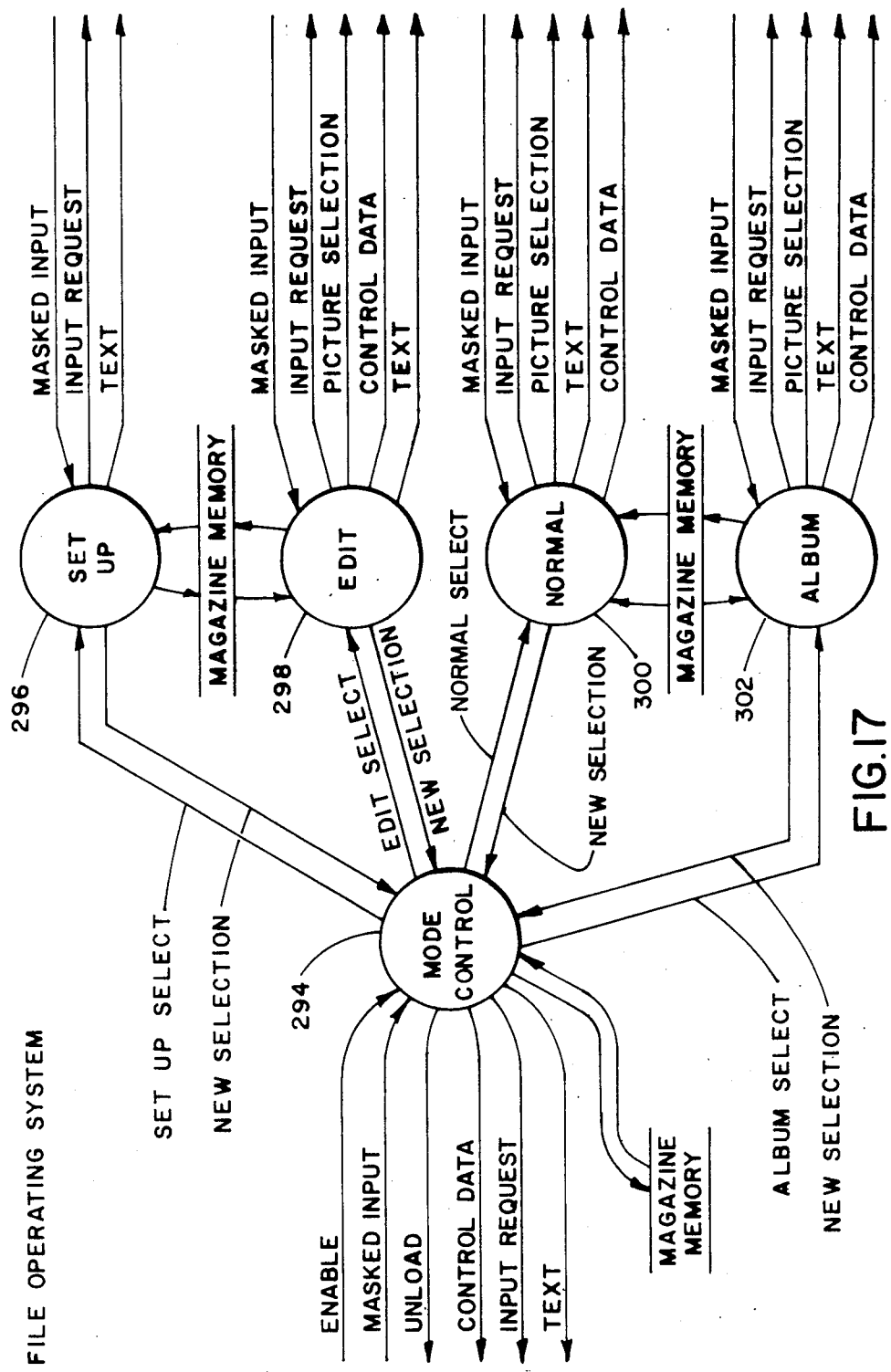
FIGS. 17–22 are lower level data flow diagrams of pertinent portions of the overall data flow diagram shown by FIG. 16.
Figure 18:
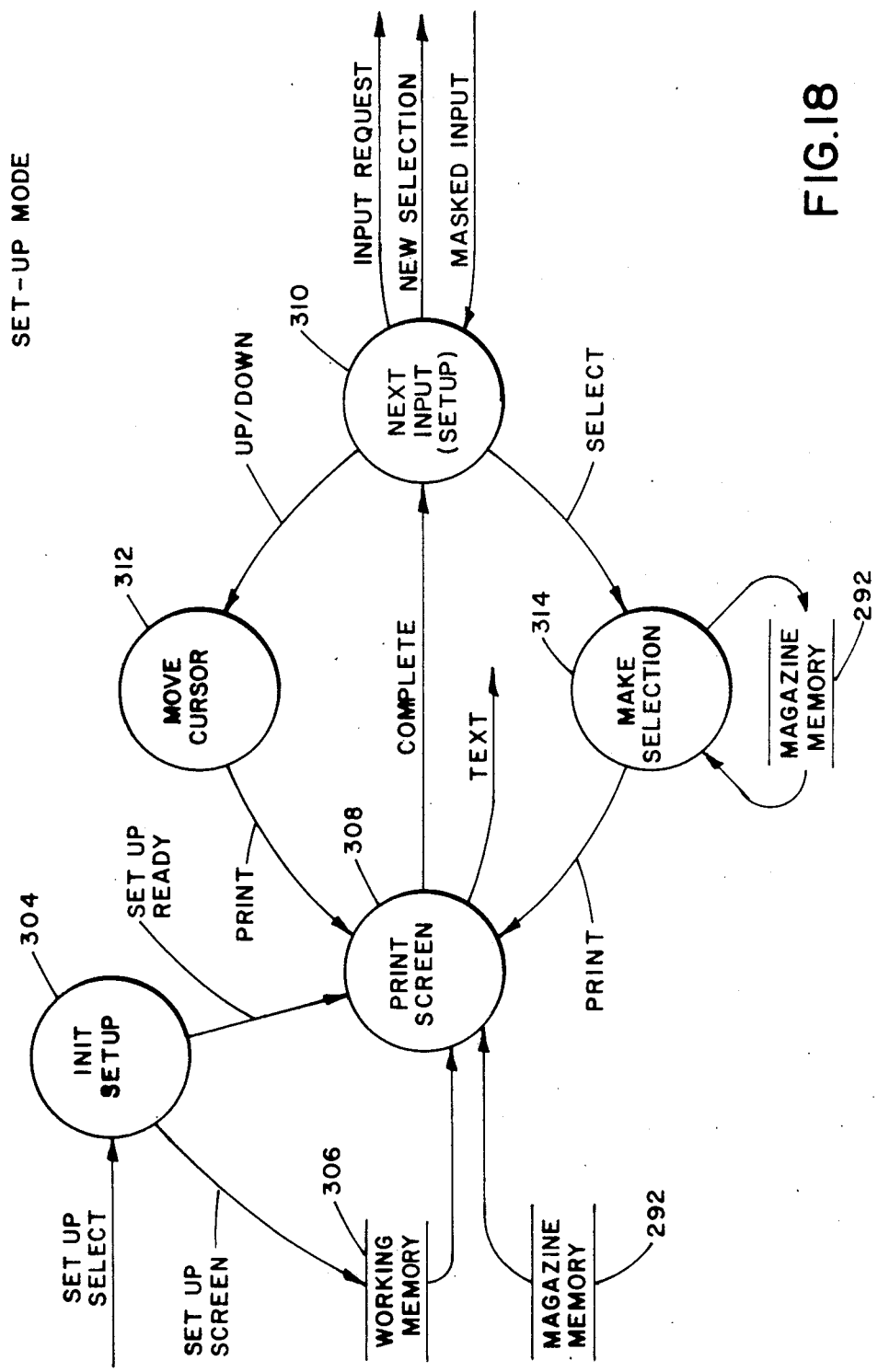
Figure 22:
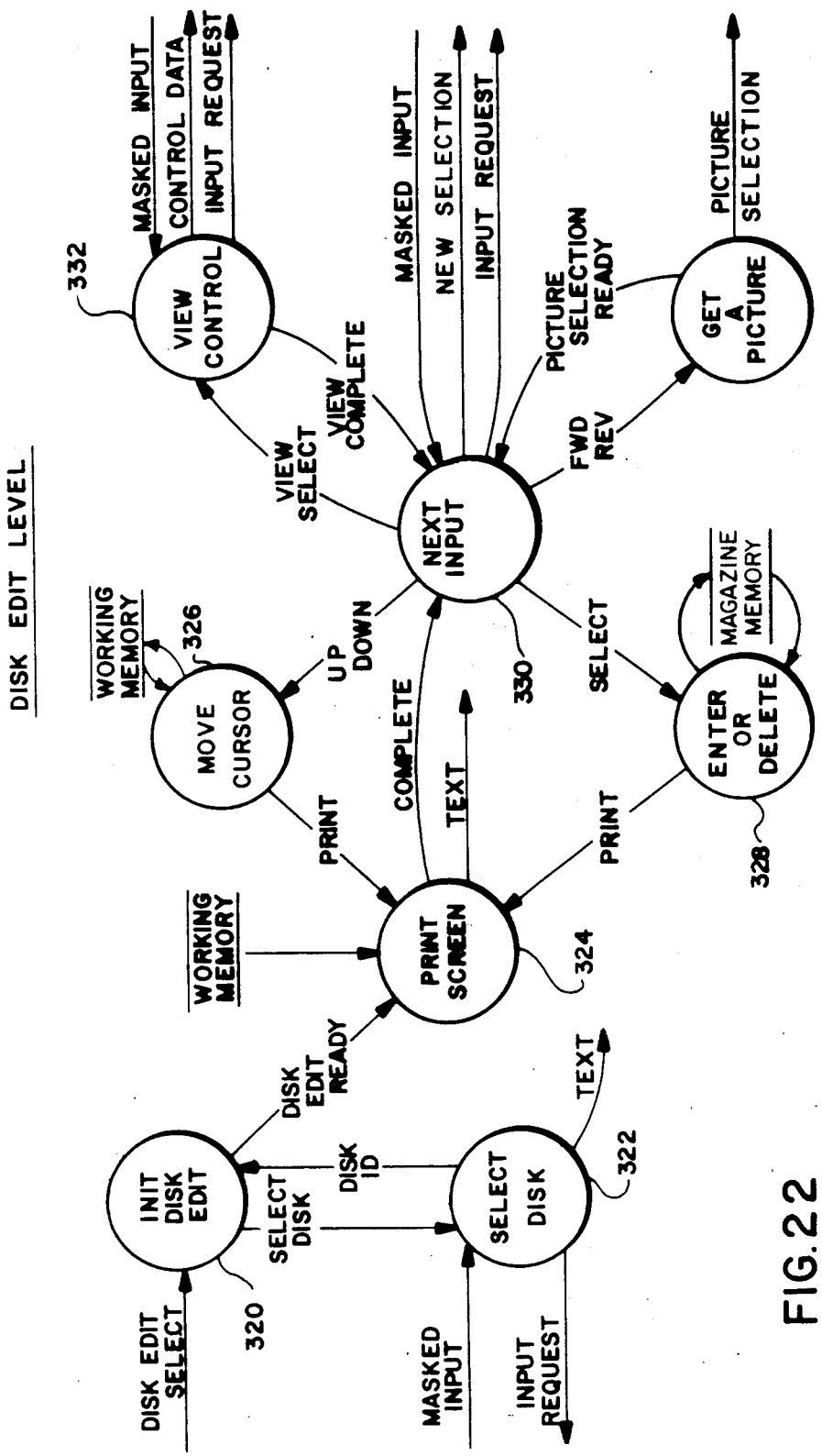

In terms of the above conventions, FIG. 16 is a context data flow diagram of the overall operating system for the video picture file portion of the video disk player. FIG. 17 is a level 1 child diagram expanding upon the file operating system "bubble" in FIG. 16 and showing the four modes of operation, that is, the "set-up", "edit", "normal" and "album" modes. FIGS. 18 through 21 are level 2 child diagrams expanding upon each of the four modes show in FIG. 17. FIG. 22 is an exemplary level 3 child diagram expanding upon the first edit level, the disk edit level, of FIG. 19. The other four edit levels of FIG. 19 may take a form similar to that of FIG. 22; they are not shown here as separate data flow diagrams. As a matter of fact, all five edit levels may be easily diagrammed in any conventional way found suitable by the programmer of ordinary skill in structured systems design. Table I (at the end of the specification) shows the data dictionary for the data names associated with the named vectors of FIGS. 16–22.

The data flow diagrams of FIGS. 16–22, in combination with the data dictionary listed in Table I, are self-explanatory to a programmer of ordinary skill in structured systems design. However, again for the general reader, some comments are helpful. Some of the process "bubbles" relate to circuit elements shown in FIGS. 13A and B. In the context diagram of FIG. 16, a user control process 280 includes operation of the remote controller 107, a video signal generation process 282 includes operation of the video circuit 205 and a graphics generation process 284 includes operation of the text generator 206. The mechanical operating system 286 and the file operating system 288 include operating programs stored in the memory 201 and executed under direction of the microcomputer 200. The picture track 290 and the magazine memory 292 correspond directly to operations involving the video tracks on the disk 14 (FIG. 2) and the memory module 34 (FIG. 3), respectively. (In the following description, data names will be printed in capital letters and refer directly to like names in the data flow diagrams and the data dictionary.)

With regard to FIG. 16, USER SELECTIONS are received from the user control 280 via CONTROLLER INPUT to the mechanical operating system 286. The file operating system 288 requests the current status of CONTROLLER INPUT via an INPUT REQUEST to the mechanical operating system 286. The CONTROLLER INPUT is an 8-bit word indicating, by which bit is set, which button on the hand controller 107 is active (i.e., has been pressed). However, recalling the discussion of the "screens", not all buttons are active for a given screen. Therefore, the file operating system 288, which controls the "screen" being displayed, masks the INPUT REQUEST. In other words, though INPUT REQUEST accommodates all 8 bits of CONTROLLER INPUT, it is responsive to a selected subset of bits depending on the "screen" in use. The response back to the file operating system 288 is MASKED INPUTS, indicating which bit passed by the mask is active. If a passed bit is active, the file operating system 288 performs whatever function corresponds to the button that was depressed.

The "menu screen" (2) is produced by a mode control process 294 shown in the level 2 diagram of FIG. 17. The mode control process 294 triggers the four file operating modes previously described by appropriate SELECT signals, specifically by providing SET-UP SELECT to the set-up process 296, EDIT SELECT to the edit process 298, NORMAL SELECT to the normal process 300 and ALBUM SELECT to the album process 302. Control is returned to the mode selection process 294 by NEW SELECTION, which is generated by pressing select when the user is pointing to "exit to menu" in any of the "edit" mode "screens". FIGS. 18–21 show exemplary sub-level data flow diagrams for the the set-up process 296, the edit process 298, the normal process 300, and the album process 302, respectively. These data flow diagrams are conventional and may be devised by a programmer of ordinary skill in structured systems design. Looking first at the set-up process diagrammed by FIG. 18, an initialization process 304 starts the set-up process. SET-UP SCREEN initializes the text signals associated with the "set-up screen", which are stored in a working memory 306 (such as the RAM 210 in FIG. 13). SET-UP READY causes the screen to print (print screen process 308), drawing upon previous conditions stored in the magazine memory 292. COMPLETE triggers the next input process 310, where the controller waits for the next MASKED INPUT. The input will to be to move the cursor (process 312) by UP/DOWN or to make a selection (process 314) by SELECT. When a selection is made, it is stored in the magazine memory 292 in place of the previous selection. The user gets out of this loop by NEW SELECTION, which leads back to the "menu screen" (2).

Figure 19:
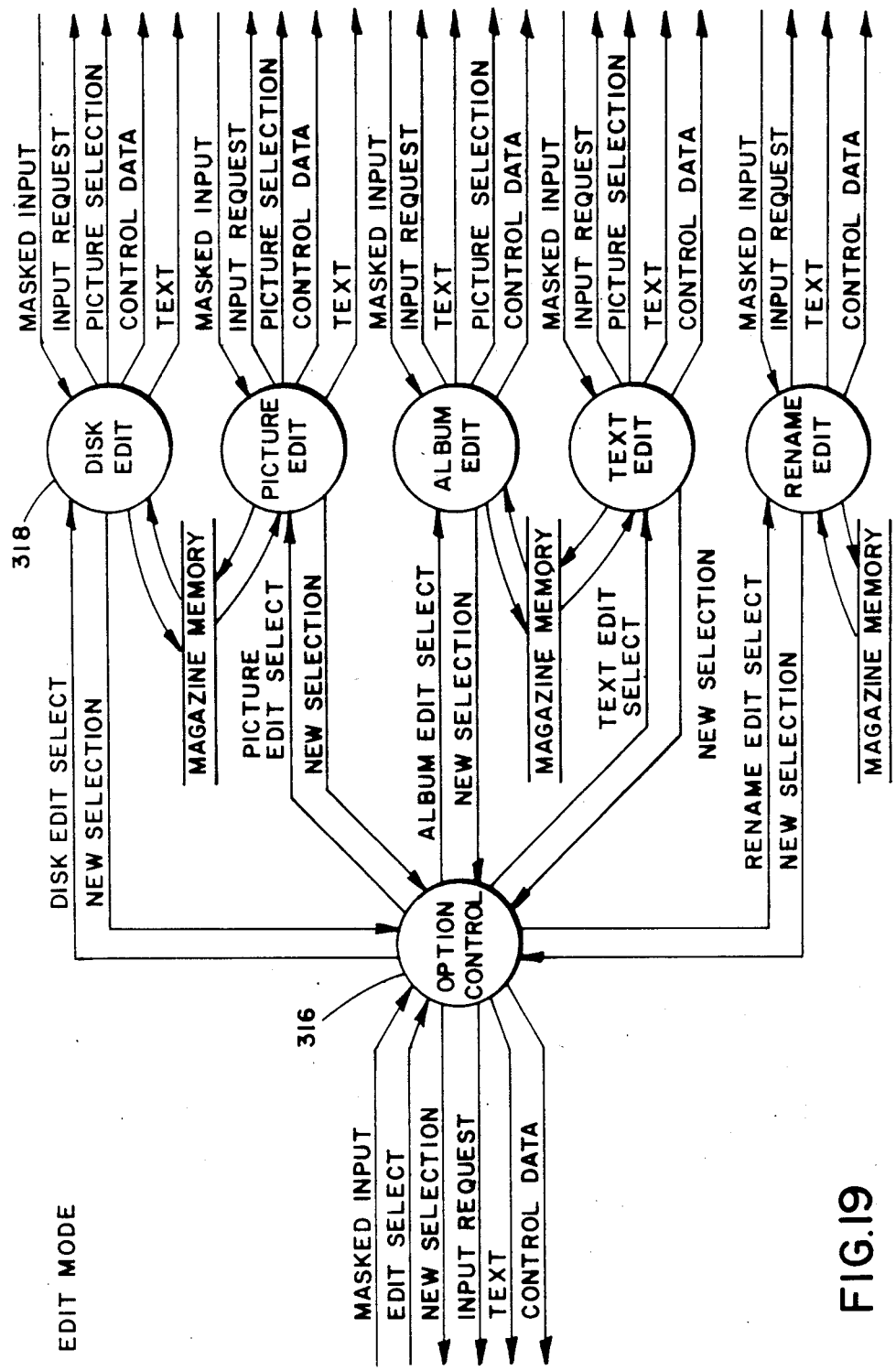

Looking next at the edit mode, the "edit option screen" (3) is generated by the edit option control 316 shown in FIG. 19. The various SELECT commands determine which option is operational. For example, DISK EDIT SELECT is sent to a disk edit process 318 when the system is currently not in that state. Going now to FIG. 22, this command turns control over to an initialization routine 320, which generates the "disk select screen" (4) in process 322. With a disk selected DISK EDIT READY is put out to a print screen process 324. The latter process prints the "edit screen" (5), beginning the repetitive data flow shown in FIG. 18 for cursor movement (process 326) and enter or delete commands (process 328). In this flow, a next input process 330 looks for an active controller button by sending an INPUT REQUEST to the mechanical operating system 286 and waiting for a MASKED INPUT to come back. With the corresponding input active, the cursor is moved, a decision to enter or delete a picture from an album is made, and the entire picture may be viewed (process 332).

Figure 20:
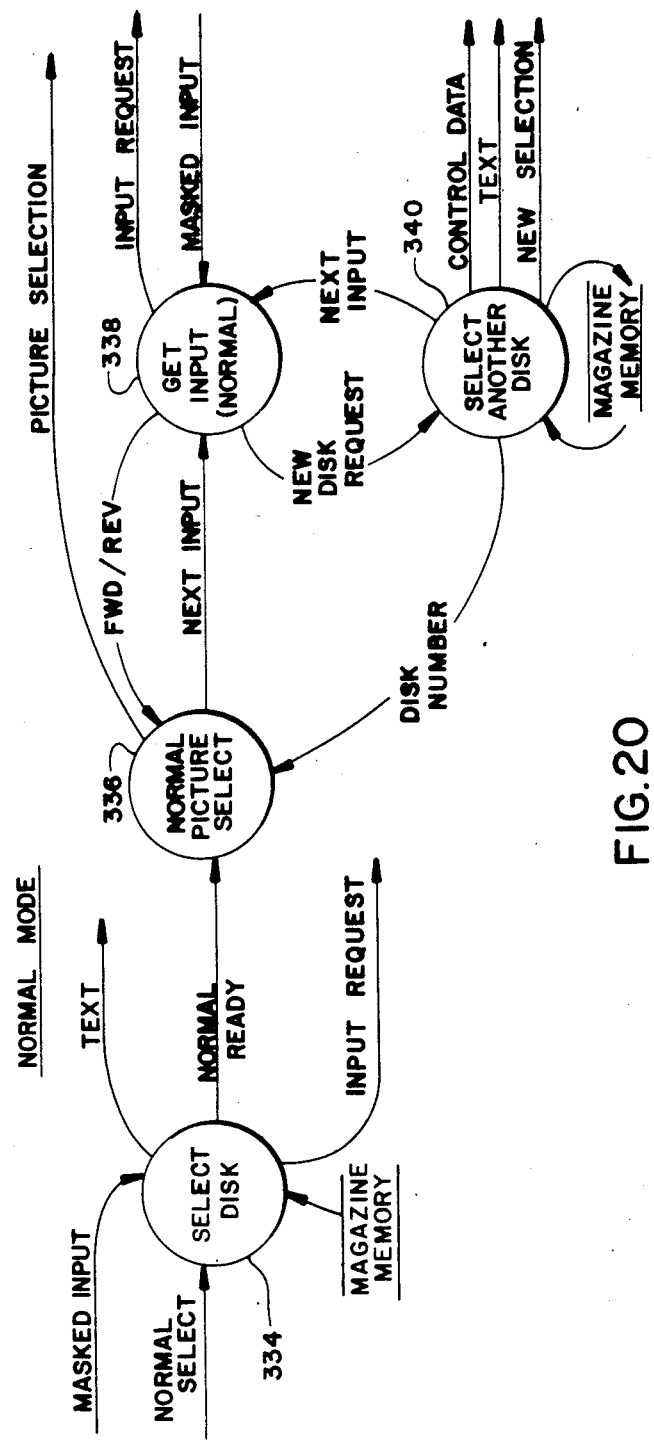
Figure 21:
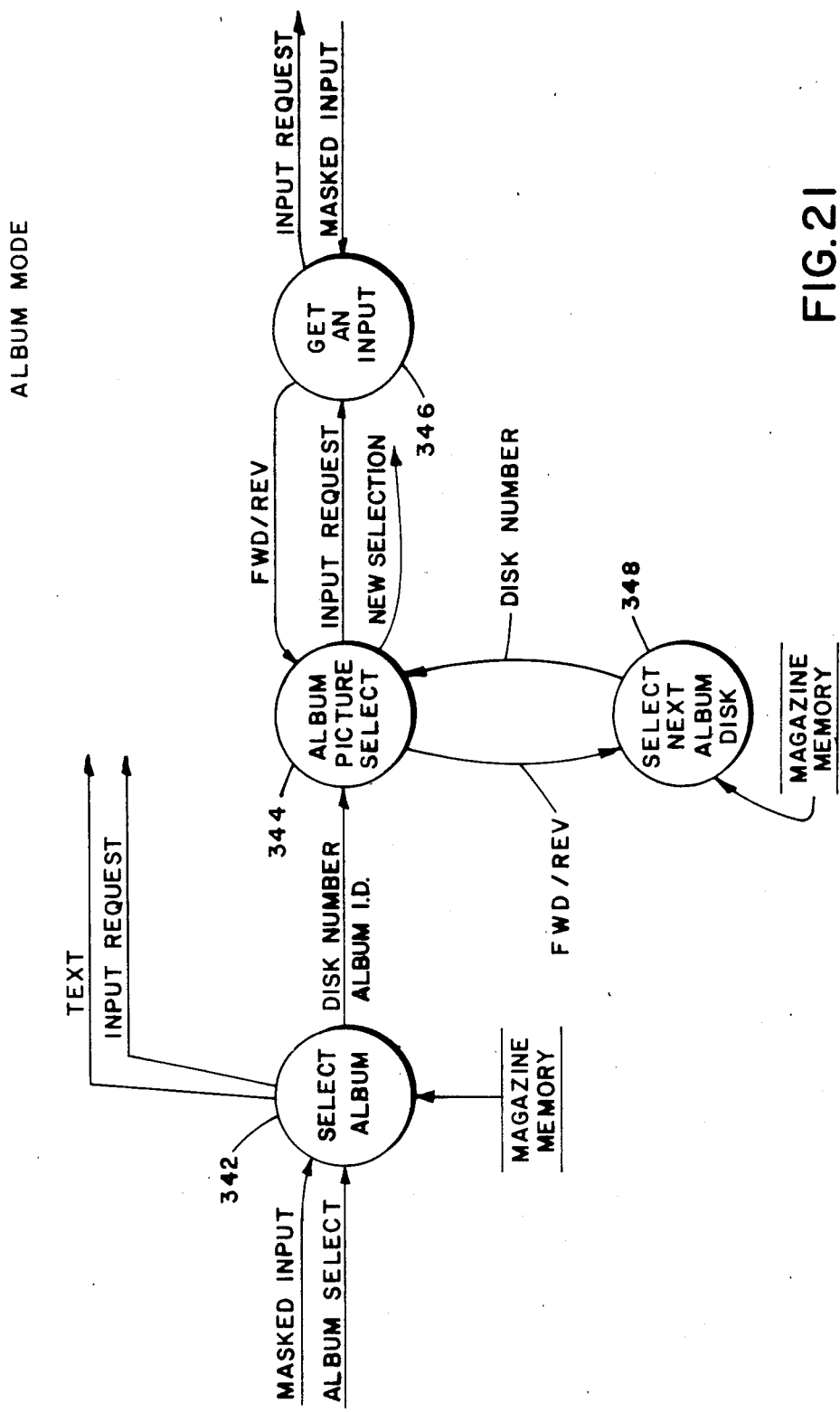

The normal viewing mode, selected by the mode control process 294 of FIG. 17, is shown by the data flow diagram of FIG. 20. Once a disk is selected (process 334), NORMAL READY starts the selection process 336. NEXT INPUT to the input process 338 conditions the normal mode for the next MASKED INPUT. A number of inputs are possible, i.e., FWD/REV to increment or decrement to the next frame or NEW DISK REQUEST to look up a new disk (via select another disk process 340). When the viewer tires of the normal mode, NEW SELECTION takes him back to the "menu screen" (2). The album viewing mode, selected by the mode control process 294 of FIG. 17, is shown in further detail by the data flow diagram of FIG. 21. Once put in this state by ALBUM SELECT, a list of albums is generated by the select album process 342. The album picture assignments are retrieved from the magazine memory 292 and the show proceeds under control of an album picture selection process 344. Picture advance is determined by either MASKED INPUT received via an input process 346 or FWD/REV commands to an auxiliary disk selection routine 348.

The data flow diagrams have not been described in all their detail since a combined reading of the specification material regarding the "screens" and the data dictionary provide the requisite information for fully interpreting the data flow diagrams. Additional information regarding the various editing levels and the corresponding data flow diagrams are found in related patent application Ser. No. 644,166.

Certain modifications of the video disk player shown by FIG. 7 and succeeding Figures and the cartridge tray 30 shown by FIG. 3 and succeeding Figures are possible. For example, one of the magnetic disks contained in the tray 30 could be devoted to the storage of video picture file data instead of having a separate memory module 34. The video disk player, through its circuit 80, would call up this dedicated disk after the tray is inserted into the player and before any pictures are shown. All current video file data could be then withdrawn and stored, for example, in the RAM 210 (FIG. 13B). If any video file data in the RAM 210 is changed during the course of processing the pictures, the circuit 80 is instructed, as a part of shut-down, to recall the dedicated disk and write the changes, or overwrite all data, on the dedicated disk.

It is also recognized that certain limitations in use of the video picture file as described herein are due to trade offs between cost and storage capacity, between user simplicity and complex capabilities and options, and the like. The result is relatively limited capacity in the memory module 34, limited input selections in the seven button remote controller 107, and limitations in the amount of logical processing that can be used to select pictures. It is obvious that these limitations may be overcome, or at least alleviated, by providing more processing power and storage locations. One way of doing this is to provide a port on the video disk player for connecting with an external computer, say any of the many home or personal computers. Video picture file data could be kept entirely separate from the video disk player and magazine, such as on an ordinary floppy disk used by the computer. The hand controller 107 could be replaced by the keyboard associated with the computer. Certain edit options, like text edit, would become relatively simpler as to input (since a full alphanumeric key pad could be used) and much more text could be stored. Pictures could be called up based on Boolean relationships, e.g., all pictures having this characteristic or that characteristic, and so on.

The invention has been described in detail with particular references to a presently preferred embodiment thereof, but it will be understood that variations and modifications can be effected within the spirit and scope of the invention.

TABLE I

| DATA DICTIONARY | |
|---|---|
| NAMES | DEFINITIONS |
| ALBUM EDIT SELECT | Call to album edit level while in another state |
| ALBUM SELECT | Call to album mode while in another state |
| COMPLETE | Return to current state from print screen |
| CONTROL DATA | Control parameters for graphics generation |
| CONTROLLER INPUT | IR signal to player |
| DISK EDIT READY | Call to print screen while in disk edit state |
| DISK EDIT SELECT | Call to disk edit level while in another state |
| DISK ID | Disk number |
| DISK EDIT SCREEN | Initialize edit screen |
| DISK NUMBER | Index into the magazine for the disk |
| EDIT SELECT | Call to edit mode while in another state |
| ENABLE | Start up file operating system |
| FWD/REV | Magazine (or frame) forward or magazine (or frame) reverse |
| GRAPHICS SIGNAL | Text and background color for TV display |
| INPUT REQUEST | Mask showing byte value for acceptable input selections |
| MAGAZINE DATA | Data from/to magazine memory |
| MAGAZINE MEMORY | EEROM on the magazine |
| MASKED INPUT | Bits set corresponding to user selection |
| NEW DISK REQUEST | Call to disk selection |
| NEW SELECTION | Return to previous state |
| NEXT INPUT | Call to normal input |
| NORMAL READY | Call to normal mode |
| NORMAL SELECT | Call to normal mode while in another state |
| NTSC VIDEO AND GRAPHICS | NTSC video signal and graphics signal |
| PICTURE | Video picture signal |
| PICTURE EDIT SELECT | Call to picture edit level while in another state |
| PICTURE SELECTION | Frame number and disk number |
| PICTURE SELECTION READY | Return to current state from picture select state |
| PICTURE TRACK | Picture video track on the disk |
| PRINT | Call to print a screen |
| RENAME EDIT SELECT | Call to rename edit level while in another state |
| SELECT | Enter cursor command |
| SELECT DISK | Call to disk select screen and return to current state |
| SET UP READY | Call to print set-up screen |
| SET UP SCREEN | Initialize set-up screen |
| SET UP SELECT | Call to set-up mode while in another state |
| TEXT | Characters for display |
| TEXT EDIT SELECT | Call to text edit level while in another state |
| UP/DOWN | Move cursor up or down |
| USER SELECTIONS | Seven button selections on remote controller |
| UNLOAD | Magazine is moved to unload position |
| VIDEO SIGNAL | Video signal from picture track |
| VIEW COMPLETE | Return to edit state showing cropped picture |
| VIEW SELECT | Call to view all of picture |
| WORKING MEMORY | RAM in player circuit |

What is claimed is:

1. Video apparatus for playing back pictures prerecorded on a plurality of video disks, said apparatus comprising:

a magazine for containing the plurality of disks;

storage means accompanying said magazine for storing data related to the pictures;

means for generating operating data prescribing an arrangement for viewing the pictures;

means for storing the operating data in said storage means; and means responsive to the operating data for playing back the pictures according to the prescribed viewing arrangement.

2. Apparatus as claimed in claim 1 in which said storage means comprises an erasable non-volatile, solid-state memory attached to said magazine.

3. Apparatus as claimed in claim 1 in which said storage means comprises a data storage disk included in said magazine and dedicated to storage of the operating data.

4. Apparatus as claimed in claim 1 wherein said generating means comprises editing means for generating operating data specifying the assignment of the pictures to one or more categories based on image content, the pictures within each category arranged according to a particular sequence.

5. Apparatus as claimed in claim 4 wherein said editing means includes means for generating operating data specifying a title for each category of pictures.

6. Apparatus as claimed in claim 4 wherein said editing means includes a text generator for generating operating data specifying a description for one or more pictures which is then played back with the pictures.

7. Apparatus as claimed in claim 4 wherein said playing back means responsive to the operating data comprises means for selecting a particular category and means for displaying the pictures within the selected category according to its prescribed viewing arrangement.

8. Video player apparatus for playing back pictures prerecorded on a plurality of video disks, said disks disposed in the player in a container of the type including a removable magazine for containing said plurality of video disks and storage means accompanying said magazine for storing data related to the pictures on the plurality of disks, wherein said player apparatus comprises:

means for generating operating data prescribing an arrangement for viewing the pictures;

means for storing the operating data in said storage means;

means for generating a picture signal from one or more video disks;

means for addressing the data stored in said storage means; and means responsive to said picture signal and said addressed data for generating a video output signal suitable for displaying the pictures according to the prescribed viewing arrangement.

9. Apparatus as claimed in claim 8 wherein said data generating means comprises editing means for assigning the pictures to one or more categories based on image content, said operating data prescribing a viewing arrangement including said assignments.

10. Apparatus as claimed in claim 9 wherein said editing means generates operating data prescribing a rearranged order for playing back the pictures prerecorded on the disks.

11. Apparatus as claimed in claim 9 wherein said editing means generates operating data prescribing elapsed view times for playing back one or more of the pictures within a category.

12. Apparatus as claimed in claim 9 wherein said editing means generates operating data prescribing a description for playing back with one or more pictures within a category.

13. Apparatus as claimed in claim 10 wherein said means responsive to said picture signal and said addressed data comprises means for selecting one of the categories and means responsive to the selected category for generating a video output signal suitable for displaying the pictures in the rearranged order of the pictures assigned to the selected category.

14. Apparatus as claimed in claim 8 wherein each disk contains video data for generating a picture signal and supplementary data related to the pictures, and wherein said means for addressing said data stored in said storage means also addresses said supplementary data and said means responsive to the addressed data is also responsive to the supplementary data for displaying the pictures according to the prescribed viewing arrangement.

15. Video player apparatus for playing back pictures prerecorded on a plurality of video disks, said disks disposed in the player in a container of the type including a removable magazine for containing said plurality of video disks, said magazine including an aperture through which a disk may be withdrawn from the magazine, and an erasable, non-volatile memory appended to said magazine for storing data related to the pictures on the plurality of disks, wherein said player apparatus comprises:

means for generating operating data prescribing an organization for viewing the pictures, said organization comprising the separation of the pictures into categories of like image content and the ordering of the display of the pictures within a category;

means for storing the operating data in said memory;

means for withdrawing a disk from said magazine;

means for generating a picture signal from the withdrawn disk;

means for addressing the operating data stored in said memory; and means responsive to said picture signal and said addressed data for generating a video output signal suitable for displaying the pictures on the withdrawn disk according to the prescribed organization.

16. Video player apparatus for playing back pictures prerecorded on a plurality of magnetic video disks, wherein at least some of the pictures are so related as to image content that they may be grouped into a plurality of viewing categories, said disks disposed in the player in a container of the type comprising a removable magazine for containing the plurality of magnetic video disks and an erasable, non-volatile solid state memory attached to said magazine for storing data identifying respective categories of pictures, wherein said video player comprises:

a digital processing network for controlling said video player;

a channel defined in said video player for receiving said magazine and said attached memory; and means responsive to the insertion of said magazine and attached memory into said channel for incorporating said memory into said digital processing network, whereby the data identifying respective categories of pictures is available for processing by the data processing network.

17. A video disk player for reproducing pictures prerecorded on a plurality of video disks, said disks disposed in the player in a removable container of the type comprising a magazine for containing said plurality of video disks, storage means appended to said magazine for storing data defining a predetermined arrangement for showing the pictures, and a connector mounted on the container for establishing electrical access to said storage means;

wherein said player provides an output signal to a display device for showing the pictures, said player comprising:

a control circuit for processing said means for engaging said connector and connecting said storage means into said control circuit when the container of video disks is placed into the player; and means responsive to the data in the connected storage means for operating said control circuit to display the pictures according to the predetermined arrangement defined by the data in said storage means.

18. A video disk player for playing back pictures prerecorded on a plurality of video disks, said disks disposed in the player in a removable container of the type including a magazine for containing said plurality of disks, an erasable, non-volatile memory device appended to said magazine for storing data prescribing a particular arrangement for displaying the pictures, and a connector establishing electrical connection to said memory device;

wherein said player cooperates with a display device for displaying the pictures, said player comprising:

a socket for receiving said connector when the container is placed in the player;

means responsive to said received connector for addressing the data stored in said memory device;

means for generating a picture signal from the video disks; and means responsive to the picture signal and the addressed data for generating an output signal to the display device for displaying the pictures according to the particular arrangment represented by the data stored in said memory device.

* * * * *

UNITED STATES PATENT OFFICE
CERTIFICATE OF CORRECTION

PATENT NO. : 4,675,755

DATED : June 23, 1987

INVENTOR(S) : Hans-Peter Baumeister et al

It is certified that error appears in the above-identified patent and that said Letters Patent are hereby corrected as shown below:

Column 12, line 23, delete "bridge" and insert --cartridge--.

Column 20, line 38, directly below the letter "A" on line 37 add the cursor --*--.

Column 29, line 22, after the word "said" add --data--.

Signed and Sealed this

Twenty-ninth Day of December, 1987

Attest:

DONALD J. QUIGG

Attesting Officer

Commissioner of Patents and Trademarks